United States Patent
Yuki et al.

(10) Patent No.: US 9,487,843 B2
(45) Date of Patent: Nov. 8, 2016

(54) METHOD FOR PRODUCING A BEARING RING

(75) Inventors: Hiroshi Yuki, Kuwana (JP); Chikara Ohki, Kuwana (JP); Kazuhiro Yagita, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 13/980,834

(22) PCT Filed: Jan. 12, 2012

(86) PCT No.: PCT/JP2012/050492
§ 371 (c)(1),
(2), (4) Date: Jul. 19, 2013

(87) PCT Pub. No.: WO2012/098988
PCT Pub. Date: Jul. 26, 2012

(65) Prior Publication Data
US 2013/0301969 A1 Nov. 14, 2013

(30) Foreign Application Priority Data

Jan. 21, 2011 (JP) ................................ 2011-010723
Jan. 21, 2011 (JP) ................................ 2011-010729
Jan. 21, 2011 (JP) ................................ 2011-010991

(51) Int. Cl.
*C21D 9/40* (2006.01)
*F16C 33/64* (2006.01)
(Continued)

(52) U.S. Cl.
CPC . *C21D 9/40* (2013.01); *C21D 1/10* (2013.01); *C21D 1/18* (2013.01); *C21D 1/19* (2013.01);
(Continued)

(58) Field of Classification Search
CPC ............ C21D 1/00; C21D 1/10; C21D 1/28; C21D 1/30; C21D 1/42; C21D 9/40; C21D 11/00; C21D 11/005; F16C 33/64; F16C 23/086; F16C 2202/04; F16C 2300/14; F16C 2204/74; F16C 2204/70; F16C 2204/66; Y10T 29/49689

USPC ............ 29/898.063, 898.066; 384/492, 527; 219/635, 632, 640, 644, 647, 652, 658, 219/676; 148/511, 508, 559, 668, 333; 266/129, 96, 87
See application file for complete search history.

(56) References Cited

U.S. PATENT DOCUMENTS

| 4,808,779 A | 2/1989 | Cogley |
| 5,085,733 A | 2/1992 | Mitamura |

(Continued)

FOREIGN PATENT DOCUMENTS

| CN | 1611628 A | 5/2005 |
| CN | 1863935 A | 11/2006 |

(Continued)

OTHER PUBLICATIONS

Machine Translation of JP 2009209429 A.*
(Continued)

*Primary Examiner* — Sarang Afzali
(74) *Attorney, Agent, or Firm* — McDermott Will & Emery LLP

(57) ABSTRACT

A method for producing a bearing ring of a rolling bearing includes the steps of: preparing a formed body constituted of hypereutectoid steel; forming an annular heated region heated to a temperature of at least an $A_1$ point on the formed body by relatively rotating an induction heating member arranged to face part of an annular region for becoming a rolling contact surface of the bearing ring in the formed body to induction-heat the formed body along the circumferential direction of the annular region; and simultaneously cooling the whole of the heated region to a temperature of not more than an $M_s$ point.

2 Claims, 7 Drawing Sheets

(51) Int. Cl.
    C21D 1/10    (2006.01)
    C21D 1/28    (2006.01)
    C21D 1/30    (2006.01)
    C22C 38/00   (2006.01)
    F16C 23/08   (2006.01)
    C21D 1/18    (2006.01)
    C21D 1/19    (2006.01)

(52) U.S. Cl.
    CPC . C21D 1/28 (2013.01); C21D 1/30 (2013.01); C22C 38/00 (2013.01); F16C 23/086 (2013.01); F16C 33/64 (2013.01); *C21D 2211/00* (2013.01); *C21D 2211/004* (2013.01); *C21D 2211/008* (2013.01); *C21D 2221/00* (2013.01); *C21D 2221/10* (2013.01); *F16C 2202/04* (2013.01); *F16C 2204/66* (2013.01); *F16C 2204/70* (2013.01); *F16C 2204/74* (2013.01); *F16C 2300/14* (2013.01); *Y02P 10/253* (2015.11); *Y10T 29/49689* (2015.01)

(56) References Cited

U.S. PATENT DOCUMENTS

| | | | |
|---|---|---|---|
| 5,456,766 | A * | 10/1995 | Beswick et al. ............. 148/216 |
| 6,030,471 | A | 2/2000 | Coles et al. |
| 6,179,936 | B1 | 1/2001 | Yoshida et al. |
| 6,197,128 | B1 | 3/2001 | Maeda |
| 6,296,721 | B1 | 10/2001 | Coles et al. |
| 7,146,735 | B2 | 12/2006 | Bracht et al. |
| 2003/0127161 | A1 | 7/2003 | Burrier |
| 2004/0000053 | A1 | 1/2004 | Bracht et al. |
| 2005/0041901 | A1 | 2/2005 | Yakura et al. |
| 2005/0141799 | A1 | 6/2005 | Uyama et al. |
| 2006/0213588 | A1 | 9/2006 | Fujita et al. |
| 2007/0127585 | A1 | 6/2007 | Nakagawa et al. |
| 2007/0194504 | A1 | 8/2007 | Nakashima et al. |
| 2007/0269336 | A1 | 11/2007 | Ohki et al. |
| 2008/0073003 | A1 * | 3/2008 | Fujita ................... C21D 1/00 148/500 |
| 2008/0141535 | A1 | 6/2008 | Rollmann et al. |
| 2009/0069100 | A1 | 3/2009 | Umekida et al. |
| 2010/0154937 | A1 * | 6/2010 | Ohki .......................... 148/215 |
| 2011/0053696 | A1 | 3/2011 | Umekida et al. |
| 2014/0305552 | A1 | 10/2014 | Ohki |

FOREIGN PATENT DOCUMENTS

| | | |
|---|---|---|
| CN | 101008044 A | 8/2007 |
| CN | 101111614 A | 1/2008 |
| CN | 101311278 A | 11/2008 |
| DE | 10 2004 047 881 A1 | 4/2006 |
| DE | 10 2007 036 891 A1 | 2/2009 |
| EP | 1517058 A1 | 3/2005 |
| JP | 45-17125 | 7/1970 |
| JP | 48-7827 A | 1/1973 |
| JP | 48-81723 | 11/1973 |
| JP | 59-118812 A | 7/1984 |
| JP | 60-145324 A | 7/1985 |
| JP | 61-127812 A | 6/1986 |
| JP | 1-152335 A | 6/1989 |
| JP | 2-205727 A | 8/1990 |
| JP | H4-349 | 1/1992 |
| JP | 11-61241 A | 3/1993 |
| JP | 5-117804 A | 5/1993 |
| JP | 06-17823 A | 1/1994 |
| JP | 06-200326 A | 7/1994 |
| JP | 10-131970 A | 5/1998 |
| JP | 11-37163 A | 2/1999 |
| JP | 1224765 A | 8/1999 |
| JP | 11-302734 A | 11/1999 |
| JP | 2000-356218 A | 12/2000 |
| JP | 2001-3116 A | 1/2001 |
| JP | 2001-3118 A | 1/2001 |
| JP | 2001-248535 A | 9/2001 |
| JP | 2001-288535 A | 10/2001 |
| JP | 2002-174251 A | 6/2002 |
| JP | 2002-242927 A | 8/2002 |
| JP | 2003-301221 A | 10/2003 |
| JP | 2004-044802 A | 2/2004 |
| JP | 2004-076003 A | 3/2004 |
| JP | 2004-100946 A | 4/2004 |
| JP | 2004-150473 A | 5/2004 |
| JP | 2004-232858 A | 8/2004 |
| JP | 2004-278781 A | 10/2004 |
| JP | 2005-62154 A | 3/2005 |
| JP | 2005-133123 A | 5/2005 |
| JP | 2005-146316 A | 6/2005 |
| JP | 2005-310645 A | 11/2005 |
| JP | 2005-325409 A | 11/2005 |
| JP | 2006-124780 A | 5/2006 |
| JP | 2006-179359 A | 7/2006 |
| JP | 2006-241559 A | 9/2006 |
| JP | 2006-292178 A | 10/2006 |
| JP | 2006-329287 A | 12/2006 |
| JP | 2007-162750 A | 6/2007 |
| JP | 2007-192828 A | 8/2007 |
| JP | 2007192298 A | 8/2007 |
| JP | 2007-239043 A | 9/2007 |
| JP | 2007-239072 A | 9/2007 |
| JP | 2007-297676 A | 11/2007 |
| JP | 2008-232212 A | 10/2008 |
| JP | 2008-303402 A | 12/2008 |
| JP | 2009-007677 A | 1/2009 |
| JP | 2009-156295 A | 7/2009 |
| JP | 2009-174004 A | 8/2009 |
| JP | 2009-197312 A | 9/2009 |
| JP | 2009-203498 A | 9/2009 |
| JP | 2009-209429 A | 9/2009 |
| JP | 2010-031307 A | 2/2010 |
| JP | 2010-048418 A | 3/2010 |
| JP | 2010-159710 A | 7/2010 |
| JP | 2010-190292 A | 9/2010 |
| JP | 2014-020538 A | 2/2014 |
| JP | 2015-180783 A | 10/2015 |
| JP | 2015-193936 A | 11/2015 |
| WO | WO 2007116875 A1 * | 10/2007 ............... C21D 1/06 |
| WO | 2009118166 A1 | 10/2009 |

OTHER PUBLICATIONS

Machine Translation of JP2009203498 A.*
Machine Translation of JP 2007239043 A.*
Notice of Grounds of Rejection Japanese Patent Application No. 2011-010729 dated May 27, 2014 with English translation.
Notice of Grounds of Rejection Japanese Patent Application No. 2011-010723 dated May 27, 2014 with English translation.
Notice of Grounds of Rejection Japanese Patent Application No. 2011-010991 dated Jul. 22, 2014 with English translation.
Japanese Office Action issued in Japanese Application No. 2011-010729 dated Aug. 26, 2014, w/English translation.
Japanese Office Action issued in Japanese Application No. 2011-010723 dated Aug. 26, 2014, w/English translation.
International Search Report in PCT/JP2012/050492 dated Apr. 17, 2012 with English Translation.
Edited by Japanese Standards Association, JIS Handbook 2007-1 Tekko 1, 1st Edition, Japanese Standards Association, Jan. 19, 2007, p. 1317.
Supplemental Partial European Search Report dated Jul. 17, 2015 issued in corresponding European Patent Application No. 12736357.0.
Decision to Grant Patent Japanese Patent Application No. 2011-010991 dated Mar. 3, 2015 with full English translation.
Supplementary European Search Report EP Application No. 12736357.0 dated Oct. 21, 2015.
Michael N. Kotzalas et al., "Tribological advancements for reliable wind turbine performance", Phil. Trans. R. Soc. A (2010) 368, pp. 4829-4850.
Notification of Sending Notice of Opposition Japanese Patent No. 5721449 dated Jan. 8, 2016, with English translation.

(56) References Cited

OTHER PUBLICATIONS

Kozo Seto, "Bearing Steel Born in the 20th Century and Having Made Dramatic Progress", Library: The Trends of Iron and Steel Technology, 2nd Series, vol. 9, Dec. 27, 1999, pp. 74-75 with partial English Translation.
Yoshinabu Akamatsu, "Effects of Low Speed on Rolling Bearing Fatigue Life", NTN Technical Review, No. 67, 1998, pp. 59-64, with English Abstract & partial translation.
"Heat treatment Of Steel", Jan. 30, 1989, pp. 426-431, with partial Engliush translation.
Notice of Grounds for Rejection Japanese Patent Application No. 2015-133699 dated Apr. 26, 2016 with English translation.
Notice of Grounds of Rejection Japanese Patent Application No. 2015-133700 dated Apr. 26, 2016 with English translation.
Non-Final Office Action U.S. Appl. No. 13/386,314 dated Feb. 4, 2016.
Non-Final Office Action U.S. Appl. No. 13/386,314 dated Oct. 30, 2015.
Notice of Grounds of Rejection Japanese Patent Application No. 2009-273385 dated Feb. 10, 2015 with English translation.
Notice of Grounds of Rejection Japanese Patent Application No. 2009-273386 dated Feb. 10, 2015 with full English translation.
Decision to Grant Patent Japanese Patent Application No. 2010-281373 dated Mar. 10, 2015 with English translation.
Entire file history of U.S. Appl. No. 13/386,314 filed Jan. 20, 2012.
Japanese Office Action issued in Japanese Application No. 2009-273387 dated Mar. 25, 2014, with English translation.
Japanese Office Action issued in Japanese Application No. 2009-273385 dated May 13, 2014, with English translation.
Japanese Office Action issued in Japanese Application No. 2009-273386 dated May 13, 2014, with English translation.
Chinese Office Action issued in Application No. 201080031258.8 dated Jan. 30, 2014 with English translation.
Notice of Grounds of Rejection in JP Application No. 2009-273386 dated Dec. 10, 2013 with English translation.
Notice of Grounds of Rejection in Japanese Patent Application No. 2009-273385 dated Dec. 10, 2013 with English translation.
Decision to Grant Patent Japanese Patent Application No. 2009-273388 dated Dec. 10, 2013 with English translation.
Notice of Grounds of Rejection in Japanese Patent Application No. 2009-170705 dated Oct. 22, 2013 with English translation.
Japanese Office Action issued in Japanese Application No. 2009-273387 dated Sep. 24, 2013 with English translation.
Chinese Office Action issued in Application No. 201080031258.8 dated Sep. 13, 2013 with English translation.
Chinese Office Action, and English translation thereof, issued in Chinese Patent Application No. 201080031258.8 dated Feb. 20, 2013.
Extended European Search Report issued in Application No. 10802284.9 dated Sep. 18, 2013.
Notice of Grounds of Rejection Japanese Application No. 2015-133687 dated May 31, 2016 with English translation.
Final Office Action U.S. Appl. No. 13/386,314 dated Aug. 12, 2016.

* cited by examiner

METHOD FOR PRODUCING A BEARING RING

RELATED APPLICATIONS

This application is the U.S. National Phase under 35 U.S.C. §371 of International Application No. PCT/JP2012/050492, filed on Jan. 12, 2012, which in turn claims the benefit of Japanese Application Nos. 2011-010723, 2011-010729, and 2011-010991, filed on Jan. 21, 2011, respectively, the disclosures of which applications are incorporated by reference herein.

TECHNICAL FIELD

The present invention relates to a method for producing a bearing ring, a bearing ring, and a rolling bearing. More particularly, the present invention relates to a method for producing a bearing ring, which makes it possible to homogeneously form a quench-hardened layer by induction quenching along a rolling contact surface over the entire circumference while suppressing the production cost for a quenching apparatus, a bearing ring of a rolling bearing in which a quench-hardened layer is formed by induction quenching along a rolling contact surface over the entire circumference, and a rolling bearing including the bearing ring.

BACKGROUND ART

Induction quenching may be employed as quench hardening on a bearing ring of a rolling bearing made of steel. This induction quenching has such advantages that equipment can be simplified and heat treatment in a short time is enabled, as compared with general quench hardening of heating the bearing ring in a furnace and thereafter dipping the same in a cooling liquid such as oil.

In order to simultaneously heat an annular region, to be quench-hardened, along a rolling contact surface of the bearing ring in the induction quenching, however, an induction heating member such as a coil for induction-heating the bearing ring must be arranged to be opposed to the rolling contact surface. In a case of quench-hardening a large-sized bearing ring, therefore, there are such problems that a large-sized coil responsive thereto and a power source of high capacity corresponding to this coil are required and the production cost for a quenching apparatus increases.

Transfer quenching employing a small-sized induction heating coil may be employed as a countermeasure for avoiding such problems. In this transfer quenching, high-frequency induction heating is executed with a coil arranged to be opposed to part of an annular region, to be heated, of a bearing ring for relatively moving along this region, and a cooling liquid such as water is injected toward the heated region immediately after passage of the coil thereby successively quench-hardening this region. In a case of merely employing this transfer quenching, however, a quench starting region and a quench ending region partially overlap with each other when the coil goes around from a region (quench starting region) where the quenching has been started and quench-hardens a region (quench ending region) to be finally subjected to the quenching. Therefore, occurrence of quench cracking resulting from re-quenching of the overlapping regions is apprehended. Further, regions adjacent to the aforementioned overlapping regions are heated to a temperature of not more than an $A_1$ point and tempered following heating of the quench ending region, and hence there is also such an apprehension that hardness lowers. When the transfer quenching is employed, therefore, a countermeasure of leaving a region (soft zone) not subjected to quenching between the quench starting region and the quench ending region is generally employed. This soft zone has low yield strength and is also insufficient in abrasion resistance, due to low hardness. Therefore, in a case of forming a soft zone on a bearing ring, it is necessary to see to it that the soft zone does not become a load region.

On the other hand, there is proposed a method for executing the aforementioned transfer quenching forming a soft zone and thereafter cutting a region corresponding to the zone while fitting a stopper body subjected to quenching into this region (refer to Japanese Patent Laying-Open No. 6-17823 (Patent Document 1), for example). Thus, remaining of the soft zone having low hardness can be avoided.

There is also proposed a method for avoiding formation of a soft zone by employing two coils oppositely moving in the circumferential direction of a bearing ring (refer to Japanese Patent Laying-Open No. 6-200326 (Patent Document 2), for example). According to this method, occurrence of a re-quenched region can also be avoided while avoiding formation of a soft zone by starting quenching in a state where the two coils are arranged to be adjacent to each other and ending the quenching on a position where the same butt against each other again.

CITATION LIST

Patent Document

PTD 1: Japanese Patent Laying-Open No. 6-17823
PTD 2: Japanese Patent Laying-Open No. 6-200326

SUMMARY OF INVENTION

Technical Problem

In the method disclosed in the aforementioned Patent Document 1, however, there is such a problem that the number of steps for producing a bearing ring remarkably increases. In the method disclosed in the aforementioned Patent Document 2, residual stress following quench hardening concentrates on a finally quenched region, and occurrence of heat treatment strain or quench cracking is apprehended.

The present invention has been proposed in order to solve the aforementioned problems. An object of the present invention is to provide a method for producing a bearing ring, which makes it possible to homogeneously form a quench-hardened layer by induction quenching along a rolling contact surface over the entire circumference while suppressing the production cost for a quenching apparatus, a bearing ring of a rolling bearing in which a quench-hardened layer is formed by induction quenching along a rolling contact surface over the entire circumference, and a rolling bearing including the bearing ring.

Solution to Problem

A method for producing a bearing ring according to the present invention is a method for producing a bearing ring of a rolling bearing. This method for producing a bearing ring includes the steps of preparing a formed body constituted of hypereutectoid steel, forming an annular heated region heated to a temperature of at least an $A_1$ point on the formed body by relatively rotating an induction heating member arranged to face part of an annular region for becoming a rolling contact surface of the bearing ring in the formed body to induction-heat the formed body along the circumferential direction of the annular region, and simultaneously cooling the whole of the heated region to a temperature of not more than an $M_s$ point.

In the method for producing a bearing ring according to the present invention, the induction heating member arranged to face part of the annular region for becoming the rolling contact surface relatively rotates along the circumferential direction, whereby the heated region is formed on the formed body. Therefore, it is possible to employ an induction heating member small with respect to the outer shape of the bearing ring. Consequently, the production cost for a quenching apparatus can be suppressed also in a case of quench-hardening a large-sized bearing ring. In the method for producing a bearing ring according to the present invention, further, the whole of the heated region is simultaneously cooled to the temperature of not more than the $M_s$ point. Therefore, it becomes possible to simultaneously form a quench-hardened layer along the rolling contact surface over the entire circumference, and residual stress is inhibited from concentrating on a partial region. In the method for producing a bearing ring according to the present invention, in addition, hypereutectoid steel capable of implementing sufficiently high hardness and a sufficient amount of carbide by quench hardening is employed as the material. Thus, according to the inventive method for producing a bearing ring, the quench-hardened layer can be homogeneously formed by induction quenching along the rolling contact surface over the entire circumference while suppressing the production cost for the quenching apparatus.

"Carbide" refers to carbide that is formed mainly of carbide of iron expressed by $Fe_3C$ (cementite). The $A_1$ point denotes a point corresponding to a temperature at which the structure of steel starts transformation from ferrite to austenite in a case of heating the steel. The $M_s$ point denotes a point corresponding to a temperature at which austenized steel starts martensitation when cooled.

In the aforementioned method for producing a bearing ring, in the step of cooling the whole of the heated region, the temperature of the heated region may be retained within a range of predetermined temperature and time in which at least a prescribed amount of carbide remains in the rolling contact surface and the rolling contact surface has a hardness of at least a prescribed hardness after the whole of the heated region is cooled, and thereafter, the whole of the heated region may be cooled.

Thus, the hypereutectoid steel is employed as the material and quenching is executed at the heating time and the heating temperature where not only the hardness but also the amount of remaining carbide is within the preferable range, whereby a bearing ring excellent in durability including abrasion resistance can be produced.

In the aforementioned method for producing a bearing ring, in the step of cooling the whole of the heated region, the temperature of the heated region may be retained within a range of predetermined temperature and time in which an area ratio of carbide in the rolling contact surface becomes at least 5.2% and a hardness of the rolling contact surface becomes at least 62 HRC after the whole of the heated region is cooled, and thereafter, the whole of the heated region may be cooled.

Thus, quenching is executed at the heating time and the heating temperature where the hardness and the amount of remaining carbide capable of sufficiently bringing out the characteristics of the hypereutectoid steel employed as the material are achieved, whereby a bearing ring more excellent in durability including abrasion resistance can be produced.

In the aforementioned method for producing a bearing ring, the hypereutectoid steel is JIS-defined high carbon-chromium bearing steel.

Since the high carbon-chromium bearing steel is standardized steel, the high carbon-chromium bearing steel is easily available and suitable as the material of the bearing ring. When the bearing ring has a large volume and high quenchability is required, SUJ3 or SUJ5 among the high carbon-chromium bearing steel is preferably employed.

The aforementioned method for producing a bearing ring may further include a step of executing normalizing on the formed body in advance of the step of forming the heated region.

The bearing ring produced by partially quench-hardening the region including the rolling contact surface by induction quenching must have hardness capable of ensuring prescribed strength also in a region (unhardened region) not quench-hardened. In order to ensure prescribed hardness in the unhardened region, tempering may be further executed after executing quenching on the whole formed body (bearing ring) before the induction quenching. When the hypereutectoid steel having a high carbon content as described above is employed as the material, however, there is such a problem that quench cracking easily takes place. In the formed body consisting of the aforementioned hypereutectoid steel, on the other hand, sufficient hardness can be ensured by normalizing. Therefore, proper hardness can be supplied to the unhardened region by executing normalizing in advance of the induction quenching, in place of the ensuring of the hardness by the aforementioned quenching and tempering.

In the aforementioned method for producing a bearing ring, shot blasting may be executed while the formed body is cooled, by spraying hard particles onto the formed body along with gas in the step of executing the normalizing.

Thus, the shot blasting can be executed simultaneously with air-blast cooling at the time of the normalizing. Therefore, scales formed on a surface layer portion of the formed body due to heating in the normalizing are removed, and characteristic reduction of the bearing ring resulting from formation of the scales or reduction of thermal conductivity resulting from formation of the scales is suppressed.

In the aforementioned method for producing a bearing ring, the induction heating member may relatively rotate at least twice along the circumferential direction of the formed body in the step of forming the heated region. Thus, homogeneous quench hardening can be implemented by suppressing dispersion in temperature in the circumferential direction of the rolling contact surface.

In the aforementioned method for producing a bearing ring, a plurality of induction heating members may be arranged along the circumferential direction of the formed body in the step of forming the heated region. Thus, homogeneous quench hardening can be implemented by suppressing dispersion in temperature in the circumferential direction of the rolling contact surface.

In the aforementioned method for producing a bearing ring, temperatures on a plurality of portions of the heated region may be measured in the step of forming the heated region. Thus, the quench hardening can be executed by performing rapid cooling after confirming that homogeneous heating is implemented in the circumferential direction of the rolling contact surface. Consequently, homogeneous quench hardening can be implemented in the circumferential direction of the rolling contact surface.

In a large-sized bearing ring of a rolling bearing, e.g., in a bearing ring of a rolling bearing having an inner diameter of at least 1000 mm, a required depth of the hardened layer is up to approximately 4.7 mm. Furthermore, in order to deal with heat treatment deformation in quench hardening, grinding must be executed on the quench-hardened bearing ring to remove a region of the surface layer portion by a thickness of approximately 3 mm. Therefore, in quench hardening on the large-sized bearing ring of the rolling bearing, a region having a thickness of approximately 8 mm from the surface is preferably quench-hardened. In order to implement such quench hardening, selection of steel as the material is important and steel exhibiting high quenchability is desirably employed as the material.

One of the indexes of quenchability is a critical cooling rate. The critical cooling rate refers to a minimum cooling rate required to martensitically transform and sufficiently harden the steel by quench hardening. When the large-sized bearing ring of the rolling bearing is quench-hardened, the cooling rate at a position located at a depth of 8 mm from the surface is estimated at approximately 3.5° C./s. Therefore, it can be said that steel whose critical cooling rate is not more than 3.5° C./s is preferably employed as the material. Steel that satisfies such condition includes, for example, JIS SUJ3, SUJ5 or the like.

A method for producing a bearing ring according to one aspect of the present invention is a method for producing a bearing ring of a rolling bearing. This method for producing a bearing ring includes the steps of preparing a formed body constituted of steel containing at least 0.95 mass % and not more than 1.10 mass % of carbon, at least 0.40 mass % and not more than 0.70 mass % of silicon, at least 0.90 mass % and not more than 1.15 mass % of manganese, and at least 0.90 mass % and not more than 1.20 mass % of chromium with the rest consisting of iron and an impurity, forming an annular heated region heated to a temperature of at least an $A_1$ point on the formed body by relatively rotating an induction heating member arranged to face part of an annular region for becoming a rolling contact surface of the bearing ring in the formed body to induction-heat the formed body along the circumferential direction of the annular region, and simultaneously cooling the whole of the heated region to a temperature of not more than an $M_s$ point.

A method for producing a bearing ring according to another aspect of the present invention is a method for producing a bearing ring of a rolling bearing. This method for producing a bearing ring includes the steps of preparing a formed body constituted of steel containing at least 0.95 mass % and not more than 1.10 mass % of carbon, at least 0.40 mass % and not more than 0.70 mass % of silicon, at least 0.90 mass % and not more than 1.15 mass % of manganese, at least 0.90 mass % and not more than 1.20 mass % of chromium, and at least 0.10 mass % and not more than 0.25 mass % of molybdenum with the rest consisting of iron and an impurity, forming an annular heated region heated to a temperature of at least an $A_1$ point on the formed body by relatively rotating an induction heating member arranged to face part of an annular region for becoming a rolling contact surface of the bearing ring in the formed body to induction-heat the formed body along the circumferential direction of the annular region, and simultaneously cooling the whole of the heated region to a temperature of not more than an $M_s$ point.

In the method for producing a bearing ring according to the present invention, the induction heating member arranged to face part of the annular region for becoming the rolling contact surface relatively rotates along the circumferential direction, whereby the heated region is formed on the formed body. Therefore, it is possible to employ an induction heating member small with respect to the outer shape of the bearing ring. Consequently, the production cost for a quenching apparatus can be suppressed also in a case of quench-hardening a large-sized bearing ring. In the method for producing a bearing ring according to the present invention, further, the whole of the heated region is simultaneously cooled to the temperature of not more than the $M_s$ point. Therefore, it becomes possible to simultaneously form a quench-hardened layer along the rolling contact surface over the entire circumference, and residual stress is inhibited from concentrating on a partial region. In the method for producing a bearing ring according to the present invention, in addition, steel capable of implementing sufficiently high hardness and a sufficient amount of carbide by quench hardening and having a proper component composition capable of suppressing quench cracking while ensuring high quenchability is employed as the material. Thus, according to the inventive method for producing a bearing ring, the quench-hardened layer can be homogeneously formed by induction quenching along the rolling contact surface over the entire circumference while suppressing the production cost for the quenching apparatus. "Carbide" refers to carbide that is formed mainly of carbide of iron expressed by $Fe_3C$ (cementite).

The reason why the component range of the steel constituting the formed body, i.e., the component range of the steel constituting the produced bearing ring has been limited to the aforementioned range is now described.

Carbon: at least 0.95 mass % and not more than 1.10 mass %

The carbon content exerts a remarkable influence on the amount of carbide of the rolling contact surface of the bearing ring after the quench hardening. If the carbon content in the steel constituting the formed body (bearing ring) is less than 0.95 mass %, it becomes difficult that a sufficient amount of carbide exists in the rolling contact surface after the quench hardening. If the carbon content exceeds 1.10 mass %, on the other hand, occurrence of cracking (quench cracking) at the time of the quench hardening is apprehended. Therefore, the carbon content has been set to at least 0.95 mass % and not more than 1.10 mass %.

Silicon: at least 0.40 mass % and not more than 0.70 mass %

Silicon contributes to improvement in temper softening resistance of the steel.

If the silicon content in the steel constituting the formed body (bearing ring) is less than 0.40 mass %, the temper softening resistance becomes insufficient, and there is a possibility that the hardness of the rolling contact surface remarkably lowers due to tempering after the quench hardening or temperature rise during use of the bearing ring. If the silicon content exceeds 0.70 mass %, on the other hand, the hardness of the material before the quenching increases, and workability at the time of forming the material into the bearing ring lowers. Therefore, the silicon content has been set to at least 0.40 mass % and not more than 0.70 mass %.

Manganese: at least 0.90 mass % and not more than 1.15 mass %

Manganese contributes to improvement in quenchability of the steel. If the manganese content is less than 0.90 mass %, this effect is not sufficiently attained. If the manganese content exceeds 1.15 mass %, on the other hand, the hardness of the material before the quenching increases, and the workability in forming the material into the bearing ring lowers. Therefore, the manganese content has been set to at least 0.90 mass % and not more than 1.15 mass %.

Chromium: at least 0.90 mass % and not more than 1.20 mass %

Chromium contributes to improvement in quenchability of the steel. If the chromium content is less than 0.90 mass %, this effect is not sufficiently attained. If the chromium content exceeds 1.20 mass %, on the other hand, the material cost rises, the hardness of the material before the quenching increases, and the workability in forming the material into the bearing ring lowers. Therefore, the chromium content has been set to at least 0.90 mass % and not more than 1.20 mass %.

Molybdenum: at least 0.10 mass % and not more than 0.25 mass %

Molybdenum also contributes to improvement in quenchability of the steel. While molybdenum is not an essential component in the steel constituting the bearing ring according to the present invention, the same can be added in a case where particularly high quenchability is required to the steel constituting the bearing ring such as a case where the outer shape of the bearing ring is large. If the molybdenum content is less than 0.10 mass %, this effect is not sufficiently attained. If the molybdenum content exceeds 0.25 mass %, on the other hand, there arises such a problem that the material cost rises. Therefore, molybdenum is preferably added as necessary in the range of at least 0.10 mass % and not more than 0.25 mass %.

The aforementioned method for producing a bearing ring may further include a step of executing normalizing on the formed body in advance of the step of forming the heated region.

The bearing ring produced by partially quench-hardening the region including the rolling contact surface by induction quenching must have hardness capable of ensuring prescribed strength also in a region (unhardened region) not quench-hardened. In order to ensure prescribed hardness in the unhardened region, tempering may be further executed after executing quenching on the whole formed body (bearing ring) before the induction quenching. When the steel having a relatively high carbon content and having the aforementioned component composition exhibiting high quenchability as described above is employed as the material, however, there is such a problem that quench cracking easily takes place. In the formed body consisting of the steel having the aforementioned component composition, on the other hand, sufficient hardness can be ensured by normalizing. Therefore, proper hardness can be supplied to the unhardened region by executing normalizing in advance of the induction quenching, in place of the ensuring of the hardness by the aforementioned quenching and tempering.

In the aforementioned method for producing a bearing ring, shot blasting may be executed while the formed body is cooled, by spraying hard particles onto the formed body along with gas in the step of executing the normalizing.

Thus, the shot blasting can be executed simultaneously with air-blast cooling at the time of the normalizing. Therefore, scales formed on a surface layer portion of the formed body due to heating in the normalizing are removed, and characteristic reduction of the bearing ring resulting from formation of the scales or reduction of thermal conductivity resulting from formation of the scales is suppressed.

In the aforementioned method for producing a bearing ring, the induction heating member may relatively rotate at least twice along the circumferential direction of the formed body in the step of forming the heated region. Thus, homogeneous quench hardening can be implemented by suppressing dispersion in temperature in the circumferential direction of the rolling contact surface.

In the aforementioned method for producing a bearing ring, a plurality of induction heating members may be arranged along the circumferential direction of the formed body in the step of forming the heated region. Thus, homogeneous quench hardening can be implemented by suppressing dispersion in temperature in the circumferential direction of the rolling contact surface.

In the aforementioned method for producing a bearing ring, temperatures on a plurality of portions of the heated region may be measured in the step of forming the heated region. Thus, the quench hardening can be executed by performing rapid cooling after confirming that homogeneous heating is implemented in the circumferential direction of the rolling contact surface. Consequently, homogeneous quench hardening can be implemented in the circumferential direction of the rolling contact surface.

A bearing ring according to one aspect of the present invention is produced by the aforementioned method for producing a bearing ring according to the present invention, and has an inner diameter of at least 1000 mm. According to the bearing ring according to the one aspect of the present invention, a large-sized bearing ring in which a quench-hardened layer is homogeneously formed by induction quenching along a rolling contact surface over the entire circumference can be provided while the cost for heat treatment is suppressed, since the same is produced by the aforementioned method for producing a bearing ring according to the present invention.

A bearing ring according to another aspect of the present invention is a bearing ring of a rolling bearing having an inner diameter of at least 1000 mm. This bearing ring is constituted of steel containing at least 0.95 mass % and not more than 1.10 mass % of carbon, at least 0.40 mass % and not more than 0.70 mass % of silicon, at least 0.90 mass % and not more than 1.15 mass % of manganese, and at least 0.90 mass % and not more than 1.20 mass % of chromium with the rest consisting of iron and an impurity, and a quench-hardened layer is formed by induction quenching along a rolling contact surface over the entire circumference.

A bearing ring according to still another aspect of the present invention is a bearing ring of a rolling bearing having an inner diameter of at least 1000 mm. This bearing ring is constituted of steel containing at least 0.95 mass % and not more than 1.10 mass % of carbon, at least 0.40 mass % and not more than 0.70 mass % of silicon, at least 0.90 mass % and not more than 1.15 mass % of manganese, at least 0.90 mass % and not more than 1.20 mass % of chromium, and at least 0.10 mass % and not more than 0.25 mass % of molybdenum with the rest consisting of iron and an impurity, and a quench-hardened layer is formed by induction quenching along a rolling contact surface over the entire circumference.

In the aforementioned bearing ring according to another aspect or still another aspect, the quench-hardened layer is formed by induction quenching along the rolling contact surface over the entire circumference. Therefore, the aforementioned bearing ring according to another aspect or still another aspect has become a bearing ring excellent in durability capable of converting any region of the rolling contact surface to a load region. In the aforementioned bearing ring according to another aspect or still another aspect, further, steel capable of implementing sufficiently high hardness and a sufficient amount of carbide by quench hardening and having a proper component composition capable of suppressing quench cracking while ensuring high quenchability is employed as the material. Thus, according to the bearing ring according to another aspect or still another aspect of the present invention, a large-sized bearing ring excellent in durability can be provided.

A rolling bearing according to the present invention includes an inner ring, an outer ring arranged to enclose the outer peripheral side of the inner ring, and a plurality of rolling elements arranged between the inner ring and the outer ring. At least either one of the inner ring and the outer ring is the aforementioned bearing ring according to the present invention.

According to the rolling bearing according to the present invention, a large-sized rolling bearing excellent in durability can be provided since the same includes the aforementioned bearing ring according to the present invention.

A main shaft connected to a blade is penetratingly fixed to the inner ring and the outer ring is fixed to a housing in a wind turbine generator, whereby the aforementioned rolling bearing can be employed as a rolling bearing (rolling bearing for a wind turbine generator) rotatably supporting the main shaft with respect to the housing. The rolling bearing according to the present invention which is the aforementioned large-sized rolling bearing excellent in durability is suitable as the rolling bearing for a wind turbine generator.

A bearing ring according to the present invention is a bearing ring of a rolling bearing having an inner diameter of at least 1000 mm. This bearing ring is constituted of hypereutectoid steel, and a quench-hardened layer is formed by induction quenching along a rolling contact surface over the entire circumference.

Conventionally, hypoeutectoid steel has been employed as the material of the bearing ring in which the quench-hardened layer is formed by induction quenching. This is based on the following reason. Specifically, when the hypoeutectoid steel is employed as the material, the intrinsic characteristics are obtained by melting a total amount of carbon contained in the steel into the steel base during heating in the quenching, and cooling and hardening the steel in this state. When the hypereutectoid steel is employed as the material, on the other hand, the characteristics are not obtained sufficiently and quench cracking may occur in some cases if the quench hardening is similarly executed. Therefore, the hypoeutectoid steel has been employed as the material of the bearing ring in which the quench-hardened layer is formed by induction quenching.

In induction quenching of a large-sized bearing ring having an inner diameter of, for example, at least 1000 mm, transfer quenching employing a small-sized induction heating coil may be employed. In this transfer quenching, high-frequency induction heating is executed with a coil arranged to be opposed to part of an annular region, to be heated, of a bearing ring for relatively moving along this region, and a cooling liquid such as water is injected toward the heated region immediately after passage of the coil thereby successively quench-hardening this region. In such a method, however, a quench starting region and a quench ending region partially overlap with each other when the coil goes around from a region (quench starting region) where the quenching has been started and quench-hardens a region (quench ending region) to be finally subjected to the quenching. Therefore, a region with reduced hardness is formed around this region and the quench-hardened layer cannot be formed along the rolling contact surface over the entire circumference. Therefore, there has been such a problem that reduction in durability caused by insufficient hardness of the interrupted region of the hardened layer cannot be avoided.

In order to deal with this, the inventor has found that, in a bearing ring of a large-sized bearing like a bearing ring of a rolling bearing having an inner diameter of at least 1000 mm, a bearing ring more excellent in durability than the conventional bearing rings is obtained by forming the quench-hardened layer along the rolling contact surface over the entire circumference, using the hypereutectoid steel that can be cooled and hardened, with a part of carbon contained in the steel remaining as carbide, in the quench hardening, and the inventor has arrived at the present invention.

In other words, a bearing ring according to the present invention is a bearing ring of a large-sized bearing in which hypereutectoid steel is employed as a material and a quench-hardened layer is formed by induction quenching along a rolling contact surface over the entire circumference. Thus, according to the bearing ring according to the present invention, there can be provided a bearing ring of a rolling bearing in which the quench-hardened layer is formed by induction quenching along the rolling contact surface over the entire circumference and durability is excellent.

In the aforementioned bearing ring, an area ratio of carbide in the rolling contact surface may be at least 5.2% and a hardness of the rolling contact surface may be at least 60 HRC. By ensuring high hardness of at least 60 HRC while leaving a sufficient amount of carbide in the rolling contact surface as described above, there can be provided a bearing ring having improved abrasion resistance and sufficient durability even when the bearing ring is used in an environment where the contact stress between the rolling element and the bearing ring is large and formation of an oil film between the rolling element and the bearing ring is insufficient.

"Carbide" refers to carbide that is formed mainly of carbide of iron expressed by $Fe_3C$ (cementite). The area ratio of carbide can be investigated, for example, by the following method. First, the bearing ring is cut along a section perpendicular to the rolling contact surface, and this section is polished. Thereafter, the section is corroded using picral (picric acid alcohol solution) as a corrosive liquid, and the metal structure directly under the rolling contact surface is observed by an optical microscope or a scanning electron microscope, and photographs are taken. Then, these photographs are image processed by an image processing device. The area ratio of carbide is thus calculated.

In the aforementioned bearing ring, the hypereutectoid steel may be JIS-defined high carbon-chromium bearing steel. Since the high carbon-chromium bearing steel is standardized steel, the high carbon-chromium bearing steel is easily available and suitable as the material of the bearing ring. When the bearing ring has a large volume and high quenchability is required, SUJ3 or SUJ5 among the high carbon-chromium bearing steel is preferably employed.

In the aforementioned bearing ring, the rolling contact surface may serve as a load region over the entire circumference. The bearing ring according to the present invention in which the quench-hardened layer is formed by induction quenching along the rolling contact surface over the entire circumference is suitable for the bearing ring in which the rolling contact surface serves as the load region over the entire circumference. The load region refers to a region where the contact stress occurs between the rolling element and the bearing ring on the rolling contact surface.

A rolling bearing according to the present invention includes an inner ring, an outer ring arranged to enclose the outer peripheral side of the inner ring, and a plurality of rolling elements arranged between the inner ring and the outer ring. At least either one of the inner ring and the outer ring is the aforementioned bearing ring according to the present invention.

According to the rolling bearing according to the present invention, a large-sized rolling bearing excellent in durability can be provided since the same includes the aforementioned bearing ring according to the present invention.

The aforementioned rolling bearing may be used in an environment where a value of an oil film parameter Λ is not more than 1. The rolling bearing according to the present invention including the bearing ring in which the hypereutectoid steel is employed as the material and durability improves is suitable for use in a severe environment where the value of oil film parameter Λ is not more than 1.

A main shaft connected to a blade is penetratingly fixed to the inner ring and the outer ring is fixed to a housing in a wind turbine generator, whereby the aforementioned rolling bearing can be employed as a rolling bearing (rolling bearing for a wind turbine generator) rotatably supporting the main shaft with respect to the housing. The rolling bearing according to the present invention which is the aforementioned large-sized rolling bearing excellent in durability is suitable as a rolling bearing for a wind turbine generator.

The aforementioned wind turbine generator may be used for offshore wind power generation. Since repair of the rolling bearing used for offshore wind power generation is difficult, it is preferable that the rolling bearing has particularly high durability. The rolling bearing according to the present invention including the bearing ring excellent in durability is suitable for such an application.

Advantageous Effects of Invention

As is clear from the foregoing description, according to the method for producing a bearing ring, the bearing ring, and the rolling bearing of the present invention, there can be provided a method for producing a bearing ring, which makes it possible to homogeneously form a quench-hardened layer by induction quenching along a rolling contact surface over the entire circumference while suppressing the production cost for a quenching apparatus, a bearing ring of a rolling bearing in which a quench-hardened layer is formed by induction quenching along a rolling contact surface over the entire circumference, and a rolling bearing including the bearing ring.

DESCRIPTION OF EMBODIMENTS

Figure 1:
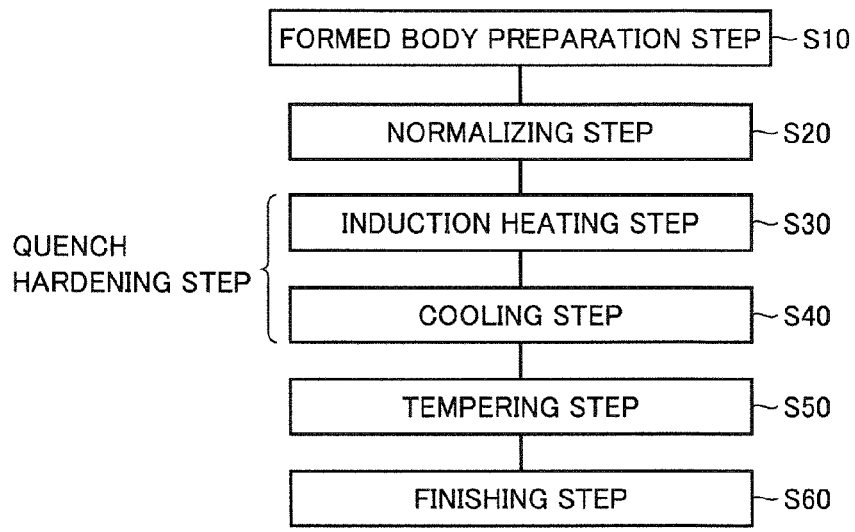
FIG. 1 is a flow chart showing an outline of a method for producing an inner ring of a rolling bearing.

Embodiments of the present invention are now described with reference to the drawings. In the following drawings, the same reference numerals are assigned to identical or corresponding portions, and redundant description is not repeated.

First Embodiment

First, a first embodiment which is an embodiment of the present invention is described with reference to a method for producing an inner ring which is a bearing ring of a rolling bearing. Referring to FIG. 1, a formed body preparation step is first carried out as a step (S10) in the method for producing an inner ring according to this embodiment. In this step (S10), a steel stock of hypereutectoid steel is prepared, and working such as forging or turning is executed, whereby a formed body having a shape responsive to a desired shape of an inner ring is prepared. More specifically, a formed body having a shape responsive to a shape of an inner ring having an inner diameter of, for example, at least 1000 mm is prepared. SUJ3, SUJ5 or the like which is JIS-defined high carbon-chromium bearing steel can, for example, be employed as the aforementioned hypereutectoid steel.

Then, a normalizing step is carried out as a step (S20). In this step (S20), the formed body prepared in the step (S10) is heated to a temperature of at least a transformation $A_1$ point and thereafter cooled to a temperature of less than the transformation $A_1$ point, whereby normalizing is executed. At this time, a cooling rate in the cooling in the normalizing may simply be a cooling rate at which the steel constituting the formed body does not transform into martensite, i.e., a cooling rate of less than a critical cooling rate. Hardness of the formed body after the normalizing becomes high when this cooling rate increases, and becomes low when the cooling rate decreases. Therefore, desired hardness can be supplied to the formed body by adjusting the cooling rate.

Then, referring to FIG. 1, a quench hardening step is carried out. This quench hardening step includes an induction heating step carried out as a step (S30) and a cooling step carried out as a step (S40). In the step (S30), referring to FIGS. 2 and 3, a coil 21 as an induction heating member is arranged to face part of a rolling contact surface 11 (annular region) which is a surface where a rolling element must roll in a formed body 10. A surface of coil 21 opposed to rolling contact surface 11 has a shape along rolling contact surface 11, as shown in FIG. 3. Then, formed body 10 is rotated on a central axis, more specifically in a direction of arrow α, while a high-frequency current is supplied to coil 21 from a power source (not shown). Thus, a surface layer region of formed body 10 including rolling contact surface 11 is induction-heated to a temperature of at least an $A_1$ point, and an annular heated region 11A along rolling contact surface 11 is formed. At this time, the temperature on the surface of rolling contact surface 11 is measured with a thermometer 22 such as a radiation thermometer, and managed.

Then, in the step (S40), water as a cooling liquid, for example, is injected toward the whole of formed body 10 including heated region 11A formed in the step (S30), whereby the whole of heated region 11A is simultaneously cooled to a temperature of not more than an $M_s$ point. Thus, heated region 11A transforms into martensite, and hardens. Through the aforementioned procedure, induction quenching is executed, and the quench hardening step is completed.

In the induction quenching, as the heating temperature becomes higher and the retaining time becomes longer, carbide in the steel melts into the steel base and the carbon concentration in the base increases. The hardness of the steel when heated region 11A is subsequently cooled to a temperature of not more than the $M_s$ point and the quench hardening is completed increases basically along with the increase in the carbon concentration in the base. If the carbon concentration in the base becomes too high, however, an amount of remaining austenite increases and the hardness lowers. If an amount of carbide melting into the base increases, an amount of carbide existing in the steel after the quench hardening decreases accordingly, and the abrasion resistance decreases. Therefore, it is preferable to retain the temperature of heated region 11A within a range of predetermined temperature and time in which at least a prescribed amount of carbide remains in rolling contact surface 11 and rolling contact surface 11 has a hardness of at least a prescribed hardness after the whole of heated region 11A is cooled, and thereafter, to cool the whole of heated region 11A. Thus, an inner ring (bearing ring) excellent in durability including abrasion resistance can be produced.

More specifically, according to studies conducted by the inventor, in order to obtain a bearing ring excellent in durability including abrasion resistance, it is preferable to retain the temperature of heated region 11A within a range of predetermined temperature and time in which an area ratio of carbide in rolling contact surface 11 becomes at least 5.2% and a hardness of rolling contact surface 11 becomes at least 62 HRC after the whole of heated region 11A is cooled, and thereafter, to cool the whole of heated region 11A.

The $A_1$ point denotes a point corresponding to a temperature at which the structure of steel starts transformation from ferrite to austenite in a case of heating the steel. The $M_s$ point denotes a point corresponding to a temperature at which austenized steel starts martensitation when cooled.

Then, a tempering step is carried out as a step (S50). In this step (S50), formed body 10 quench-hardened in the steps (S30) and (S40) is charged into a furnace, for example, heated to a temperature of not more than the $A_1$ point and retained for a prescribed time, whereby tempering is executed. Thus, the hardness of at least 60 HRC is preferably ensured although the hardness of rolling contact surface 11 lowers.

Then, a finishing step is carried out as a step (S60). In this step (S60), finishing such as polishing is executed on rolling contact surface 11, for example. Through the aforementioned process, an inner ring which is a bearing ring of a rolling bearing is completed, and production of the bearing ring according to this embodiment is completed.

Figure 2:
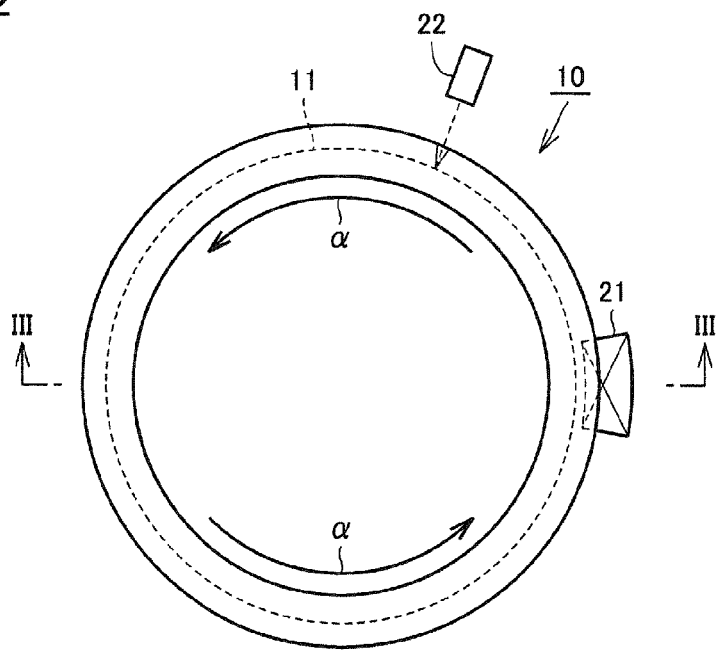
FIG. 2 is a schematic diagram for illustrating a quench hardening step.
Figure 3:
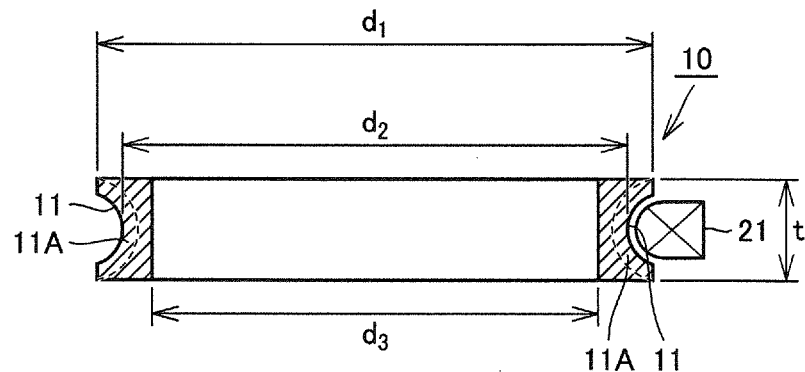
FIG. 3 is a schematic sectional view showing a section taken along the line segment III-III in FIG. 2.

Referring to FIGS. 2 and 3, inner ring 10 according to this embodiment produced as described above has an inner diameter $d_3$ of, for example, at least 1000 mm and is constituted of hypereutectoid steel such as high carbon-chromium bearing steel (SUJ3, SUJ5 or the like). In inner ring 10, quench-hardened layer 11A is homogeneously formed by induction quenching along rolling contact surface 11 over the entire circumference. Thus, inner ring 10 according to this embodiment is a bearing ring of a rolling bearing in which quench-hardened layer 11A is formed by induction quenching along rolling contact surface 11 over the entire circumference and durability is excellent.

In inner ring 10, further, the area ratio of carbide in rolling contact surface 11 is preferably at least 5.2% and the hardness of rolling contact surface 11 is preferably at least 60 HRC. Thus, there can be obtained inner ring 10 having sufficient durability even when inner ring 10 is used in an environment where the contact stress between a rolling element and inner ring 10 is large and formation of an oil film between the rolling element and inner ring 10 is insufficient. Such a structure is obtained by retaining the temperature of heated region 11A within the range of predetermined temperature and time in which the aforementioned area ratio of carbide in and the aforementioned hardness of rolling contact surface 11 can be achieved, and thereafter, cooling the whole of heated region 11A in the aforementioned quench hardening step.

In this embodiment, coil 21 arranged to face part of the rolling contact surface of formed body 10 is relatively rotated along the circumferential direction in the step (S30), whereby heated region 11A is formed on formed body 10. Therefore, it is possible to employ coil 21 small with respect to the outer shape of formed body 10, and the production cost for a quenching apparatus can be suppressed also in a case of quench-hardening large-sized formed body 10. In this embodiment, further, the whole of heated region 11A is simultaneously cooled to the temperature of not more than the $M_s$ point. Therefore, it becomes possible to form an annular quench-hardened region homogeneous in the circumferential direction, and residual stress is inhibited from concentrating on a partial region. Furthermore, in this embodiment, the hypereutectoid steel capable of implementing sufficiently high hardness and a sufficient amount of carbide by quench hardening is employed as the material. Consequently, according to the method for producing an inner ring according to this embodiment, the inner ring (bearing ring) in which the quench-hardened layer is homogeneously formed by induction quenching along the rolling contact surface over the entire circumference and durability including abrasion resistance is excellent can be produced while suppressing the production cost for the quenching apparatus.

While the aforementioned step (S20) is not an essential step in the method for producing a bearing ring according to the present invention, the hardness of an unhardened region (region other than the quench-hardened layer) of the produced bearing ring can be adjusted by carrying out this.

In the aforementioned step (S20), shot blasting may be executed while formed body 10 is cooled, by spraying hard particles onto formed body 10 along with gas. Thus, the shot blasting can be executed simultaneously with air-blast cooling at the time of the normalizing. Therefore, scales formed on the surface layer portion of formed body 10 due to heating in the normalizing are removed, and characteristic reduction of the bearing ring resulting from formation of the scales or reduction of thermal conductivity resulting from formation of the scales is suppressed. As the hard particles (projection material), metal particles made of steel or cast iron can be employed, for example.

While formed body 10 may rotate at least once in the aforementioned step (S30), the same preferably rotates a plurality of times, in order to implement more homogeneous quench hardening by suppressing dispersion in temperature in the circumferential direction. In other words, coil 21 as an induction heating member preferably relatively rotates at least twice along the circumferential direction of the rolling contact surface of formed body 10.

Second Embodiment

A second embodiment which is another embodiment of the present invention is now described. A method for producing an inner ring according to the second embodiment is basically carried out similarly to the case of the first embodiment, and attains similar effects. However, the method for producing an inner ring according to the second embodiment is different from the case of the first embodiment in arrangement of coils 21 in a step (S30).

Figure 4:
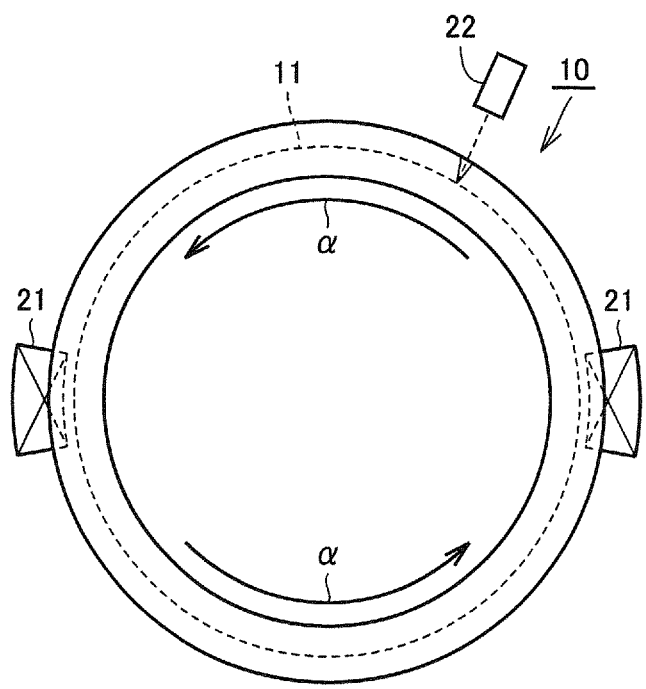
FIG. 4 is a schematic diagram for illustrating a quench hardening step.

In other words, referring to FIG. 4, a pair of coils 21 are arranged to hold a formed body 10 therebetween in the step (S30) in the second embodiment. Then, formed body 10 is rotated in a direction of arrow α, while a high-frequency current is supplied to coils 21 from a power source (not shown). Thus, a surface layer region of formed body 10 including a rolling contact surface 11 is induction-heated to a temperature of at least an $A_1$ point, and an annular heated region 11A along rolling contact surface 11 is formed.

Thus, plurality of (in this embodiment two) coils 21 are arranged along the circumferential direction of formed body 10, whereby the method for producing an inner ring of a rolling bearing according to the second embodiment has become a method for producing a bearing ring capable of implementing homogeneous quench hardening by suppressing dispersion in temperature in the circumferential direction. In order to further suppress the dispersion in temperature in the circumferential direction, coils 21 are preferably arranged at regular intervals in the circumferential direction of formed body 10.

Third Embodiment

A third embodiment which is a further embodiment of the present invention is now described. A method for producing an inner ring according to the third embodiment is basically carried out similarly to the cases of the first and second embodiments, and attains similar effects. However, the method for producing an inner ring according to the third embodiment is different from the cases of the first and second embodiments in arrangement of thermometers 22 in a step (S30).

Figure 5:
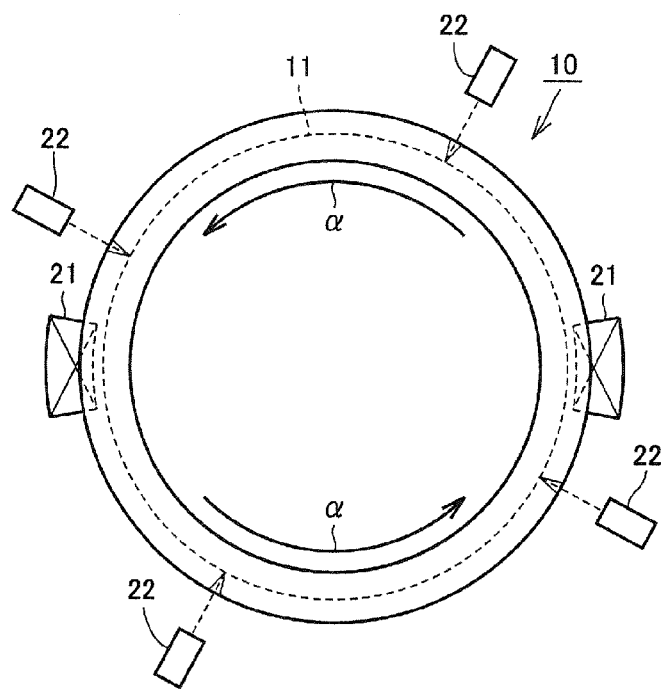
FIG. 5 is a schematic diagram for illustrating a quench hardening step.

In other words, referring to FIG. 5, temperatures on a plurality of portions (four portions here) of a rolling contact surface 11 which is a heated region are measured in the step (S30) in the third embodiment. More specifically, a plurality of thermometers 22 are arranged at regular intervals along the circumferential direction of rolling contact surface 11 of a formed body 10 in the step (S30) in the third embodiment.

Thus, the temperatures on the plurality of portions are simultaneously measured in the circumferential direction of rolling contact surface 11, whereby quench hardening can be executed by rapidly cooling formed body 10 after confirming that homogeneous heating is implemented in the circumferential direction of rolling contact surface 11. Consequently, more homogeneous quench hardening can be implemented in the circumferential direction of rolling contact surface 11 according to the method for producing an inner ring of a rolling bearing according to the third embodiment.

While the case of fixing coils 21 and rotating formed body 10 has been described in the aforementioned embodiment, coils 21 may be rotated in the circumferential direction of formed body 10 while fixing formed body 10, or coils 21 may be relatively rotated along the circumferential direction of formed body 10 by rotating both of coils 21 and formed body 10. However, wires or the like supplying a current to coils 21 are necessary for coils 21, and hence it is for the most part rational to fix coils 21 as described above.

While a case where an inner ring of a radial rolling bearing is produced as an example of a bearing ring has been described in the aforementioned embodiment, a bearing ring to which the present invention is applicable is not restricted to this, but may be an outer ring of a radial rolling bearing or a bearing ring of a thrust bearing, for example. In a case of heating an outer ring of a radial rolling bearing, for example, in the step (S20), coils 21 may be arranged to face a rolling contact surface formed on an inner peripheral side of a formed body. In a case of heating a bearing ring of a thrust rolling bearing, for example, in the step (S20), coils 21 may be arranged to face a rolling contact surface formed on an end surface side of a formed body.

While the length of coils 21 as induction heating members in the circumferential direction of formed body 10 can be so properly decided as to efficiently implement homogeneous heating, the same can be set to about ¹⁄₁₂ of the length of the region to be heated, i.e., a length of such a degree that a central angle with respect to the central axis of the formed body (bearing ring) becomes 30°, for example.

Further, specific conditions for the induction quenching in the present invention can be properly set in consideration of conditions such as the size and the thickness of and the material for the bearing ring (formed body), the capacity of the power source and the like.

In order to suppress dispersion in temperature in the circumferential direction, a step of retaining the formed body in a state where the heating is stopped is preferably provided after completion of the induction heating and before the cooling to the temperature of not more than the $M_s$ point. More specifically, dispersion in temperature in the circumferential direction on the surface of the heated region can be suppressed to about not more than 20° C. under the aforementioned conditions of the shape of the formed body and the heating, by retaining the formed body in the state where the heating is stopped for three seconds after completion of the heating, for example.

Fourth Embodiment

A fourth embodiment in which bearing rings according to the present invention are employed as bearing rings constituting bearings for a wind turbine generator (rolling bearings for a wind turbine generator) is now described.

Figure 6:
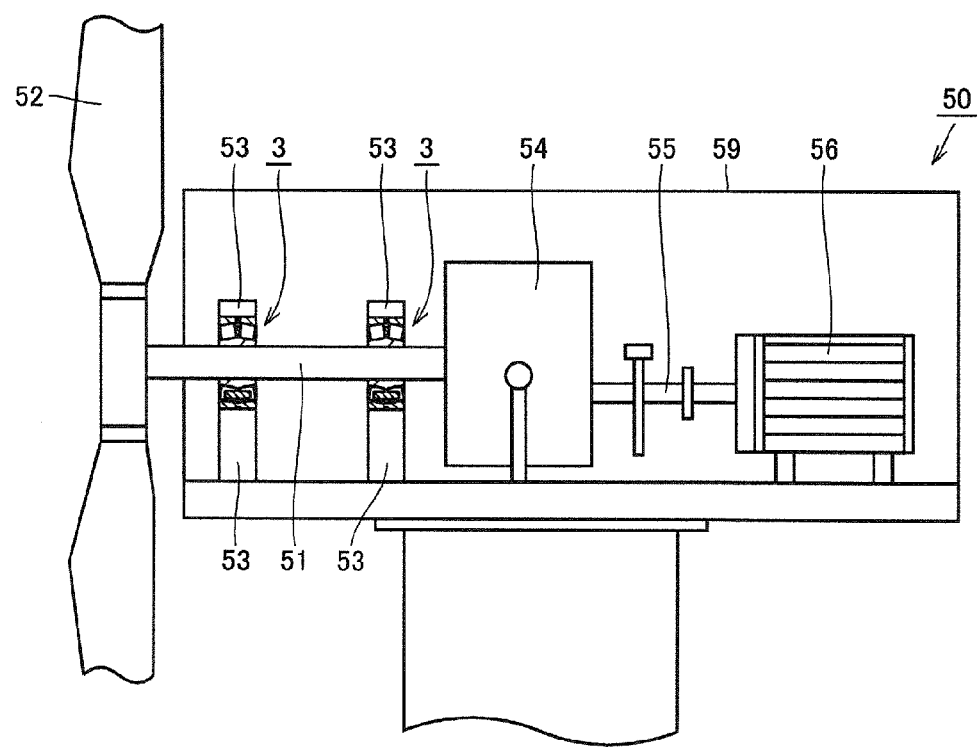
FIG. 6 is a schematic diagram showing the structure of a wind turbine generator including a rolling bearing for a wind turbine generator.

Referring to FIG. 6, a wind turbine generator 50 includes a blade 52 which is a swirler, a main shaft 51 connected to blade 52 on one end to include a center shaft of blade 52, and a speed increaser 54 connected to another end of main shaft 51. Further, speed increaser 54 includes an output shaft 55, and output shaft 55 is connected to a generator 56. Main shaft 51 is supported by main shaft bearings 3 which are rolling bearings for a wind turbine generator, to be rotatable on an axis. A plurality of (in FIG. 6 two) main shaft bearings 3 are arranged in line in the axial direction of main shaft 51, and held by housings 53 respectively. Main shaft bearings 3, housings 53, speed increaser 54 and generator 56 are stored in a nacelle 59 which is a machinery room. Main shaft 51 protrudes from nacelle 59 on one end, and is connected to blade 52.

Operation of wind turbine generator 50 is now described. Referring to FIG. 6, when blade 52 rotates in the circumferential direction by receiving wind power, main shaft 51 connected to blade 52 rotates on the axis while being supported by main shaft bearings 3 with respect to housings 53. The rotation of main shaft 51 is transmitted to speed increaser 54 to be speeded up, and converted to rotation of output shaft 55 on an axis. The rotation of output shaft 55 is transmitted to generator 56, and electromotive force is so generated by electromagnetic induction that power generation is achieved.

Figure 7:
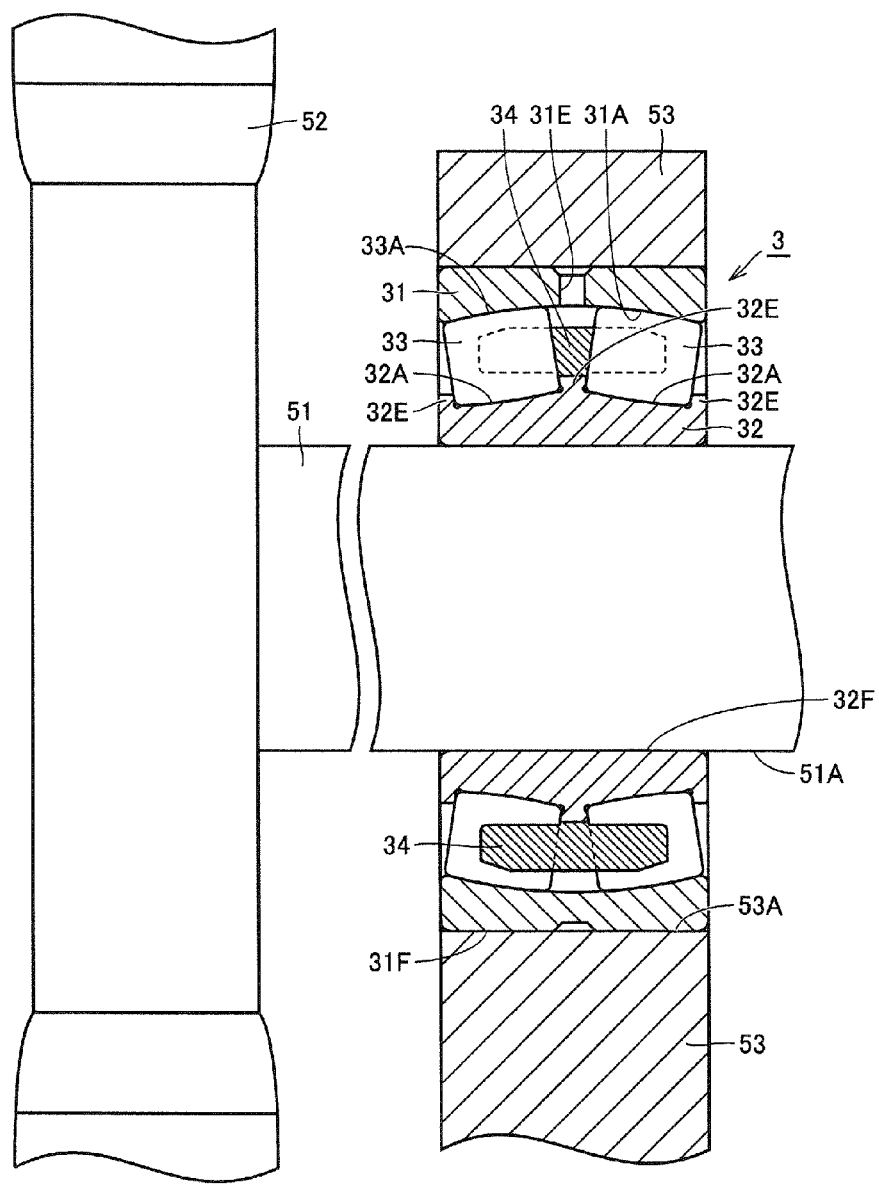
FIG. 7 is a schematic sectional view showing the periphery of a main shaft bearing in FIG. 6 in an enlarged manner.

A support structure for main shaft 51 of wind turbine generator 50 is now described. Referring to FIG. 7, each main shaft bearing 3 as a rolling bearing for a wind turbine generator includes an annular outer ring 31 as a bearing ring of the rolling bearing for a wind turbine generator, an annular inner ring 32 as another bearing ring of the rolling bearing for a wind turbine generator arranged on the inner peripheral side of outer ring 31, and a plurality of rollers 33 arranged between outer ring 31 and inner ring 32 and held by an annular cage 34. An outer ring rolling contact surface 31A is formed on the inner peripheral surface of outer ring 31, and two inner ring rolling contact surfaces 32A are formed on the outer peripheral surface of inner ring 32. Outer ring 31 and inner ring 32 are so arranged that two inner ring rolling contact surfaces 32A are opposed to outer ring rolling contact surface 31A. Further, plurality of rollers 33 are in contact with outer ring rolling contact surface 31A and inner ring rolling contact surfaces 32A on roller contact surfaces 33A along the respective ones of two inner ring rolling contact surfaces 32A, and held by cage 34 and arranged at a prescribed pitch in the circumferential direction, to be rollably held on double rows (two rows) of annular raceways. A through-hole 31E passing through outer ring 31 in the radial direction is formed in outer ring 31. A lubricant can be supplied to a space between outer ring 31 and inner ring 32 through this through-hole 31E. Outer ring 31 and inner ring 32 of main shaft bearing 3 are mutually relatively rotatable, due to the aforementioned structure.

On the other hand, main shaft 51 connected to blade 52 passes through inner ring 32 of main shaft bearing 3, is in contact with an inner peripheral surface 32F of the inner ring on an outer peripheral surface 51A, and fixed to inner ring 32. Outer ring 31 of main shaft bearing 3 is fitted to come into contact with an inner wall 53A of a through-hole formed in housing 53 on an outer peripheral surface 31F, and fixed to housing 53. Main shaft 51 connected to blade 52 is rotatable on the axis with respect to outer ring 31 and housing 53 integrally with inner ring 32, due to the aforementioned structure.

Further, flange portions 32E protruding toward outer ring 31 are formed on both ends of inner ring rolling contact surfaces 32A in the width direction. Thus, a load in the axial direction (axial direction) of main shaft 51 caused by blade 52 receiving wind is supported. Outer ring rolling contact surface 31A has a spherical surface shape. Therefore, outer ring 31 and inner ring 32 can mutually form an angle while centering on the center of this spherical surface on a section perpendicular to the rolling direction of rollers 33. In other words, main shaft bearing 3 is a double-row self-aligning roller bearing. Consequently, even in a case where main shaft 51 is deflected due to blade 52 receiving wind, housing 53 can stably rotatably hold main shaft 51 through main shaft bearing 3.

Outer ring 31 and inner ring 32 as bearing rings of a rolling bearing for a wind turbine generator according to the fourth embodiment are produced by the method for producing a bearing ring according to the aforementioned first to third embodiments, for example, and have a structure similar to that of inner ring 10 in the aforementioned first embodiment. In other words, outer ring 31 and inner ring 32 are bearing rings of a rolling bearing for a wind turbine generator having inner diameters of at least 1000 mm. Outer ring 31 and inner ring 32 are constituted of hypereutectoid steel and quench-hardened layers are homogeneously formed by induction quenching along outer ring rolling contact surface 31A and inner ring rolling contact surfaces 32A over the entire circumference. In other words, outer ring 31 and inner ring 32 have inner diameters of at least 1000 mm, are constituted of hypereutectoid steel, and have quench-hardened layers, formed by induction quenching, of annular shapes along the circumferential direction having uniform depths, and the surfaces of the quench-hardened layers form outer ring rolling contact surface 31A and inner ring rolling contact surfaces 32A respectively. Consequently, aforementioned outer ring 31 and inner ring 32 have become large-sized bearing rings excellent in durability, in which quench-hardened layers are homogeneously formed by induction quenching along the rolling contact surfaces over the entire circumference while the cost for heat treatment is suppressed, and have become bearing rings constituting a bearing for a wind turbine generator usable also in a severe environment.

Since aforementioned inner ring 32 rotates together with main shaft 51, inner ring rolling contact surface 32A serves as a load region over the entire circumference. On the other hand, in inner ring 32, the quench-hardened layer is formed by induction quenching along inner ring rolling contact surface 32A over the entire circumference. Therefore, even when inner ring rolling contact surface 32A serves as the load region over the entire circumference, inner ring 32 has sufficient durability.

Furthermore, main shaft bearing 3 may be used in an environment where a value of oil film parameter Λ is not more than 1 due to repeated rotation and stop of main shaft 51, and the like. On the other hand, outer ring 31 and inner ring 32 constituting main shaft bearing 3 are bearing rings according to the present invention excellent in durability including abrasion resistance. Therefore, even in a case of use in such a severe environment, main shaft bearing 3 has sufficient durability. Main shaft bearing 3 excellent in durability is also suitable as a main shaft bearing for offshore wind power generation where repair is difficult.

While the bearings for a wind turbine generator have been described as examples of the large-sized rolling bearing in the aforementioned fourth embodiment, application to another large-sized rolling bearing is also possible. More specifically, the bearing ring according to the present invention can be suitably applied to a bearing ring of a rolling bearing for a CT scanner supporting a rotatable mounting on which an X-ray irradiation portion of a CT scanner is set to be rotatable with respect to a fixed mounting arranged to be opposed to the rotatable mounting, for example. Further, the bearing ring according to the present invention is applicable to a bearing ring of an arbitrary rolling bearing such as a deep groove ball bearing, an angular contact ball bearing, a cylindrical roller bearing, a tapered roller bearing, a self-aligning roller bearing or a thrust ball bearing, for example.

Fifth Embodiment

A fifth embodiment which is one embodiment of the present invention is first described with reference to a method for producing an inner ring which is a bearing ring of a rolling bearing. Referring to FIG. 1, a formed body preparation step is first carried out as a step (S10) in the method for producing an inner ring according to this embodiment. In this step (S10), a steel stock containing at least 0.95 mass % and not more than 1.10 mass % of carbon, at least 0.40 mass % and not more than 0.70 mass % of silicon, at least 0.90 mass % and not more than 1.15 mass % of manganese, and at least 0.90 mass % and not more than 1.20 mass % of chromium with the rest consisting of iron and an impurity is prepared and working such as forging or turning is executed, whereby a formed body having a shape responsive to a desired shape of an inner ring is prepared. More specifically, a formed body responsive to the shape of an inner ring having an inner diameter of at least 1000 mm is prepared. When the inner ring to be produced is particularly large and higher quenchability is required to steel, a steel stock to which at least 0.10 mass % and not more than 0.25 mass % of molybdenum is added in addition to the aforementioned alloy components may be employed. As steel satisfying the aforementioned component composition, JIS SUJ3, SUJ5 or the like can be listed, for example.

Then, a normalizing step is carried out as a step (S20). In this step (S20), the formed body prepared in the step (S10) is heated to a temperature of at least a transformation $A_1$ point and thereafter cooled to a temperature of less than the transformation $A_1$ point, whereby normalizing is executed. At this time, a cooling rate in the cooling in the normalizing may simply be a cooling rate at which the steel constituting the formed body does not transform into martensite, i.e., a cooling rate of less than a critical cooling rate. Hardness of the formed body after the normalizing becomes high when this cooling rate increases, and becomes low when the cooling rate decreases. Therefore, desired hardness can be supplied to the formed body by adjusting the cooling rate.

Then, referring to FIG. 1, a quench hardening step is carried out. This quench hardening step includes an induction heating step carried out as a step (S30) and a cooling step carried out as a step (S40). In the step (S30), referring to FIGS. 2 and 3, a coil 21 as an induction heating member is arranged to face part of a rolling contact surface 11 (annular region) which is a surface where a rolling element must roll in a formed body 10. A surface of coil 21 opposed to rolling contact surface 11 has a shape along rolling contact surface 11, as shown in FIG. 3. Then, formed body 10 is rotated on a central axis, more specifically in a direction of arrow α, while a high-frequency current is supplied to coil 21 from a power source (not shown). Thus, a surface layer region of formed body 10 including rolling contact surface 11 is induction-heated to a temperature of at least the $A_1$ point, and an annular heated region 11A along rolling contact surface 11 is formed. At this time, the temperature on the surface of rolling contact surface 11 is measured with a thermometer 22 such as a radiation thermometer, and managed.

Then, in the step (S40), water as a cooling liquid, for example, is injected toward the whole of formed body 10 including heated region 11A formed in the step (S30), whereby the whole of heated region 11A is simultaneously cooled to a temperature of not more than an $M_s$ point. Thus, heated region 11A transforms into martensite, and hardens. Through the aforementioned procedure, induction quenching is executed, and the quench hardening step is completed.

Then, a tempering step is carried out as a step (S50). In this step (S50), formed body 10 quench-hardened in the steps (S30) and (S40) is charged into a furnace, for example, heated to a temperature of not more than the $A_1$ point and retained for a prescribed time, whereby tempering is executed.

Then, a finishing step is carried out as a step (S60). In this step (S60), finishing such as polishing is executed on rolling contact surface 11, for example. Through the aforementioned process, the inner ring of the rolling bearing is completed, and production of the inner ring according to this embodiment is completed. Consequently, referring to FIGS. 2 and 3, an inner ring 10, having an inner diameter $d_3$ of at least 1000 mm, in which a quench-hardened layer is homogeneously formed by induction quenching along rolling contact surface 11 over the entire circumference is completed.

According to this embodiment, coil 21 arranged to face part of the rolling contact surface of formed body 10 is relatively rotated along the circumferential direction in the step (S30), whereby heated region 11A is formed on formed body 10. Therefore, it is possible to employ coil 21 small with respect to the outer shape of formed body 10, and the production cost for a quenching apparatus can be suppressed also in a case of quench-hardening large-sized formed body 10. According to this embodiment, further, the whole of heated region 11A is simultaneously cooled to the temperature of not more than the $M_s$ point. Therefore, it becomes possible to form an annular quench-hardened region homogeneous in the circumferential direction, and residual stress is inhibited from concentrating on a partial region. According to this embodiment, in addition, steel capable of implementing sufficiently high hardness and a sufficient amount of carbide by quench hardening and having a proper component composition capable of suppressing quench cracking while ensuring high quenchability is employed as the material. Consequently, the method for producing an inner ring according to this embodiment has become a method for producing a bearing ring capable of homogeneously forming a quench-hardened layer by induction quenching along a rolling contact surface over the entire circumference while suppressing the production cost for a quenching apparatus.

While the aforementioned step (S20) is not an essential step in the method for producing a bearing ring according to the present invention, the hardness of an unhardened region (region other than the quench-hardened layer) of the produced bearing ring can be adjusted by carrying out this. It is also possible to achieve the adjustment of the hardness of the unhardened region by executing quenching and tempering, in place of the step (S20). However, the steel having a high carbon content and having the aforementioned component composition exhibiting high quenchability is employed as the material in this embodiment, and hence quench cracking easily takes place. Therefore, normalizing is preferably executed as the step (S20) for hardness adjustment of the unhardened region.

In the aforementioned step (S20), shot blasting may be executed while formed body 10 is cooled, by spraying hard particles onto formed body 10 along with gas. Thus, the shot blasting can be executed simultaneously with air-blast cooling at the time of the normalizing. Therefore, scales formed on the surface layer portion of formed body 10 due to heating in the normalizing are removed, and characteristic reduction of the bearing ring resulting from formation of the scales or reduction of thermal conductivity resulting from formation of the scales is suppressed. As the hard particles (projection material), metal particles made of steel or cast iron can be employed, for example.

While formed body 10 may rotate at least once in the aforementioned step (S30), the same preferably rotates a plurality of times, in order to implement more homogeneous quench hardening by suppressing dispersion in temperature in the circumferential direction. In other words, coil 21 as an induction heating member preferably relatively rotates at least twice along the circumferential direction of the rolling contact surface of formed body 10.

Sixth Embodiment

A sixth embodiment which is a further embodiment of the present invention is now described. A method for producing an inner ring according to the sixth embodiment is basically carried out similarly to the case of the fifth embodiment, and attains similar effects. However, the method for producing an inner ring according to the sixth embodiment is different from the case of the fifth embodiment in arrangement of coils 21 in a step (S30).

In other words, referring to FIG. 4, a pair of coils 21 are arranged to hold a formed body 10 therebetween in the step (S30) in the sixth embodiment. Then, formed body 10 is rotated in a direction of arrow α, and a high-frequency current is supplied to coils 21 from a power source (not shown). Thus, a surface layer region of formed body 10 including a rolling contact surface 11 is induction-heated to a temperature of at least an $A_1$ point, and an annular heated region 11A along rolling contact surface 11 is formed.

Thus, a plurality of (in this embodiment two) coils 21 are arranged along the circumferential direction of formed body 10, whereby the method for producing an inner ring of a rolling bearing according to the sixth embodiment has become a method for producing a bearing ring capable of implementing homogeneous quench hardening by suppressing dispersion in temperature in the circumferential direction. In order to further suppress the dispersion in temperature in the circumferential direction, coils 21 are preferably arranged at regular intervals in the circumferential direction of formed body 10.

Seventh Embodiment

A seventh embodiment which is a further embodiment of the present invention is now described. A method for producing an inner ring according to the seventh embodiment is basically carried out similarly to the cases of the fifth and sixth embodiments, and attains similar effects. However, the method for producing an inner ring according to the seventh embodiment is different from the cases of the fifth and sixth embodiments in arrangement of thermometers 22 in a step (S30).

In other words, referring to FIG. 5, temperatures on a plurality of portions (four portions here) of a rolling contact surface 11 which is a heated region are measured in the step (S30) in the seventh embodiment. More specifically, a plurality of thermometers 22 are arranged at regular intervals along the circumferential direction of rolling contact surface 11 of a formed body 10 in the step (S30) in the seventh embodiment.

Thus, the temperatures on the plurality of portions are simultaneously measured in the circumferential direction of rolling contact surface 11, whereby quench hardening can be executed by rapidly cooling formed body 10 after confirming that homogeneous heating is implemented in the circumferential direction of rolling contact surface 11. Consequently, more homogeneous quench hardening can be implemented in the circumferential direction of rolling contact surface 11 according to the method for producing an inner ring of a rolling bearing according to the seventh embodiment.

While the case of fixing coils 21 and rotating formed body 10 has been described in the aforementioned embodiment, coils 21 may be rotated in the circumferential direction of formed body 10 while fixing formed body 10, or coils 21 may be relatively rotated along the circumferential direction of formed body 10 by rotating both of coils 21 and formed body 10. However, wires or the like supplying a current to coils 21 are necessary for coils 21, and hence it is for the most part rational to fix coils 21 as described above.

While a case where an inner ring of a radial rolling bearing is produced as an example of a bearing ring has been described in the aforementioned embodiment, a bearing ring to which the present invention is applicable is not restricted to this, but may be an outer ring of a radial rolling bearing or a bearing ring of a thrust bearing, for example. In a case of heating an outer ring of a radial rolling bearing, for example, in the step (S20), coils 21 may be arranged to face a rolling contact surface formed on an inner peripheral side of a formed body. In a case of heating a bearing ring of a thrust rolling bearing, for example, in the step (S20), coils 21 may be arranged to face a rolling contact surface formed on an end surface side of a formed body.

While the length of coils 21 as induction heating members in the circumferential direction of formed body 10 can be so properly decided as to efficiently implement homogeneous heating, the same can be set to about $\frac{1}{12}$ of the length of the region to be heated, i.e., a length of such a degree that a central angle with respect to the central axis of the formed body (bearing ring) becomes 30°, for example.

Further, specific conditions for the induction quenching in the present invention can be properly set in consideration of conditions such as the size and the thickness of and the material for the bearing ring (formed body), the capacity of the power source and the like.

In order to suppress dispersion in temperature in the circumferential direction, a step of retaining the formed body in a state where the heating is stopped is preferably provided after completion of the induction heating and before the cooling to the temperature of not more than the $M_s$ point. More specifically, dispersion in temperature in the circumferential direction on the surface of the heated region can be suppressed to about not more than 20° C. under the aforementioned conditions of the shape of the formed body and the heating, by retaining the formed body in the state where the heating is stopped for three seconds after completion of the heating, for example.

Eighth Embodiment

An eighth embodiment in which bearing rings according to the present invention are employed as bearing rings constituting bearings for a wind turbine generator (rolling bearings for a wind turbine generator) is now described.

Referring to FIG. 6, a wind turbine generator 50 includes a blade 52 which is a swirler, a main shaft 51 connected to blade 52 on one end to include a center shaft of blade 52, and a speed increaser 54 connected to another end of main shaft 51. Further, speed increaser 54 includes an output shaft 55, and output shaft 55 is connected to a generator 56. Main shaft 51 is supported by main shaft bearings 3 which are rolling bearings for a wind turbine generator, to be rotatable on an axis. A plurality of (in FIG. 6 two) main shaft bearings 3 are arranged in line in the axial direction of main shaft 51, and held by housings 53 respectively. Main shaft bearings 3, housings 53, speed increaser 54 and generator 56 are stored in a nacelle 59 which is a machinery room. Main shaft 51 protrudes from nacelle 59 on one end, and is connected to blade 52.

Operation of wind turbine generator 50 is now described. Referring to FIG. 6, when blade 52 rotates in the circumferential direction by receiving wind power, main shaft 51 connected to blade 52 rotates on the axis while being supported by main shaft bearings 3 with respect to housings 53. The rotation of main shaft 51 is transmitted to speed increaser 54 to be speeded up, and converted to rotation of output shaft 55 on an axis. The rotation of output shaft 55 is transmitted to generator 56, and electromotive force is so generated by electromagnetic induction that power generation is achieved.

A support structure for main shaft 51 of wind turbine generator 50 is now described. Referring to FIG. 7, each main shaft bearing 3 as a rolling bearing for a wind turbine generator includes an annular outer ring 31 as a bearing ring of the rolling bearing for a wind turbine generator, an annular inner ring 32 as another bearing ring of the rolling bearing for a wind turbine generator arranged on the inner peripheral side of outer ring 31, and a plurality of rollers 33 arranged between outer ring 31 and inner ring 32 and held by an annular cage 34. An outer ring rolling contact surface 31A is formed on the inner peripheral surface of outer ring 31, and two inner ring rolling contact surfaces 32A are formed on the outer peripheral surface of inner ring 32. Outer ring 31 and inner ring 32 are so arranged that two inner ring rolling contact surfaces 32A are opposed to outer ring rolling contact surface 31A. Further, plurality of rollers 33 are in contact with outer ring rolling contact surface 31A and inner ring rolling contact surfaces 32A on roller contact surfaces 33A along the respective ones of two inner ring rolling contact surfaces 32A, and held by cage 34 and arranged at a prescribed pitch in the circumferential direction, to be rollably held on double rows (two rows) of annular raceways. A through-hole 31E passing through outer ring 31 in the radial direction is formed in outer ring 31. A lubricant can be supplied to a space between outer ring 31 and inner ring 32 through this through-hole 31E. Outer ring 31 and inner ring 32 of main shaft bearing 3 are mutually relatively rotatable, due to the aforementioned structure.

On the other hand, main shaft 51 connected to blade 52 passes through inner ring 32 of main shaft bearing 3, is in contact with an inner peripheral surface 32F of the inner ring on an outer peripheral surface 51A, and fixed to inner ring 32. Outer ring 31 of main shaft bearing 3 is fitted to come into contact with an inner wall 53A of a through-hole formed in housing 53 on an outer peripheral surface 31F, and fixed to housing 53. Main shaft 51 connected to blade 52 is rotatable on the axis with respect to outer ring 31 and housing 53 integrally with inner ring 32, due to the aforementioned structure.

Further, flange portions 32E protruding toward outer ring 31 are formed on both ends of inner ring rolling contact surfaces 32A in the width direction. Thus, a load in the axial direction (axial direction) of main shaft 51 caused by blade 52 receiving wind is supported. Outer ring rolling contact surface 31A has a spherical surface shape. Therefore, outer ring 31 and inner ring 32 can mutually form an angle while centering on the center of this spherical surface on a section perpendicular to the rolling direction of rollers 33. In other words, main shaft bearing 3 is a double-row self-aligning roller bearing. Consequently, even in a case where main shaft 51 is deflected due to blade 52 receiving wind, housing 53 can stably rotatably hold main shaft 51 through main shaft bearing 3.

Outer ring 31 and inner ring 32 as bearing rings of a rolling bearing for a wind turbine generator according to the eighth embodiment are produced by the method for producing a bearing ring according to the aforementioned fifth to seventh embodiments, for example. Outer ring 31 and inner ring 32 are bearing rings of a rolling bearing for a wind turbine generator having inner diameters of at least 1000 mm. In outer ring 31 and inner ring 32, quench-hardened layers are homogeneously formed by induction quenching along outer ring rolling contact surface 31A and inner ring rolling contact surfaces 32A over the entire circumference. In other words, outer ring 31 and inner ring 32 have inner diameters of at least 1000 mm, and have quench-hardened layers, formed by induction quenching, of annular shapes along the circumferential direction having uniform depths, and the surfaces of the quench-hardened layers form outer ring rolling contact surface 31A and inner ring rolling contact surfaces 32A respectively. Consequently, aforementioned outer ring 31 and inner ring 32 have become large-sized bearing rings in which quench-hardened layers are homogeneously formed by induction quenching along the rolling contact surfaces over the entire circumference while the cost for heat treatment is suppressed, and have become bearing rings constituting a bearing for a wind turbine generator usable also in a severe environment.

The method for producing a bearing ring according to the present invention is suitable for production of a bearing ring of a large-sized rolling bearing. While the bearings for a wind turbine generator have been described as examples of the large-sized rolling bearing in the aforementioned eighth embodiment, application to another large-sized rolling bearing is also possible. More specifically, the method for producing a bearing ring according to the present invention can be suitably applied to production of a bearing ring of a rolling bearing for a CT scanner supporting a rotatable mounting on which an X-ray irradiation portion of a CT scanner is set to be rotatable with respect to a fixed mounting arranged to be opposed to the rotatable mounting, for example. Further, the method for producing a bearing ring according to the present invention is applicable to a bearing ring of an arbitrary rolling bearing such as a deep groove ball bearing, an angular contact ball bearing, a cylindrical roller bearing, a tapered roller bearing, a self-aligning roller bearing or a thrust ball bearing, for example.

Ninth Embodiment

First, a ninth embodiment which is an embodiment of the present invention is described with reference to a method for producing an inner ring which is a bearing ring of a rolling bearing. Referring to FIG. 1, a formed body preparation step is first carried out as a step (S10) in the method for producing an inner ring according to this embodiment. In this step (S10), a steel stock of hypereutectoid steel is prepared, and working such as forging or turning is executed, whereby a formed body having a shape responsive to a desired shape of an inner ring is prepared. More specifically, a formed body having a shape responsive to a shape of an inner ring having an inner diameter of, for example, at least 1000 mm is prepared. SUJ3, SUJ5 or the like which is JIS-defined high carbon-chromium bearing steel can, for example, be employed as the aforementioned hypereutectoid steel.

Then, a normalizing step is carried out as a step (S20). In this step (S20), the formed body prepared in the step (S10)

is heated to a temperature of at least a transformation $A_1$ point and thereafter cooled to a temperature of less than the transformation $A_1$ point, whereby normalizing is executed. At this time, a cooling rate in the cooling in the normalizing may simply be a cooling rate at which the steel constituting the formed body does not transform into martensite, i.e., a cooling rate of less than a critical cooling rate. Hardness of the formed body after the normalizing becomes high when this cooling rate increases, and becomes low when the cooling rate decreases. Therefore, desired hardness can be supplied to the formed body by adjusting the cooling rate.

Then, referring to FIG. 1, a quench hardening step is carried out. This quench hardening step includes an induction heating step carried out as a step (S30) and a cooling step carried out as a step (S40). In the step (S30), referring to FIGS. 2 and 3, a coil 21 as an induction heating member is arranged to face part of a rolling contact surface 11 (annular region) which is a surface where a rolling element must roll in a formed body 10. A surface of coil 21 opposed to rolling contact surface 11 has a shape along rolling contact surface 11, as shown in FIG. 3. Then, formed body 10 is rotated on a central axis, more specifically in a direction of arrow α, while a high-frequency current is supplied to coil 21 from a power source (not shown). Thus, a surface layer region of formed body 10 including rolling contact surface 11 is induction-heated to a temperature of at least an $A_1$ point, and an annular heated region 11A along rolling contact surface 11 is formed. At this time, the temperature on the surface of rolling contact surface 11 is measured with a thermometer 22 such as a radiation thermometer, and managed.

Then, in the step (S40), water as a cooling liquid, for example, is injected toward the whole of formed body 10 including heated region 11A formed in the step (S30), whereby the whole of heated region 11A is simultaneously cooled to a temperature of not more than an $M_s$ point. Thus, heated region 11A transforms into martensite, and hardens. Through the aforementioned procedure, induction quenching is executed, and the quench hardening step is completed.

In the induction quenching, as the heating temperature becomes higher and the retaining time becomes longer, carbide in the steel melts into the steel base and the carbon concentration in the base increases. The hardness of the steel when heated region 11A is subsequently cooled to a temperature of not more than the $M_s$ point and the quench hardening is completed increases basically along with the increase in the carbon concentration in the base. If the carbon concentration in the base becomes too high, however, an amount of remaining austenite increases and the hardness lowers. If an amount of carbide melting into the base increases, an amount of carbide existing in the steel after the quench hardening decreases accordingly, and the abrasion resistance decreases. Therefore, it is preferable to retain the temperature of heated region 11A within a range of predetermined temperature and time in which at least a prescribed amount of carbide remains in rolling contact surface 11 and rolling contact surface 11 has a hardness of at least a prescribed hardness after the whole of heated region 11A is cooled, and thereafter, to cool the whole of heated region 11A. Thus, an inner ring (bearing ring) excellent in durability including abrasion resistance can be produced.

More specifically, according to studies conducted by the inventor, in order to obtain a bearing ring excellent in durability including abrasion resistance, it is preferable to retain the temperature of heated region 11A within a range of predetermined temperature and time in which an area ratio of carbide in rolling contact surface 11 becomes at least 5.2% and a hardness of rolling contact surface 11 becomes at least 62 HRC after the whole of heated region 11A is cooled, and thereafter, to cool the whole of heated region 11A.

Then, a tempering step is carried out as a step (S50). In this step (S50), formed body 10 quench-hardened in the steps (S30) and (S40) is charged into a furnace, for example, heated to a temperature of not more than the $A_1$ point and retained for a prescribed time, whereby tempering is executed.

Then, a finishing step is carried out as a step (S60). In this step (S60), finishing such as polishing is executed on rolling contact surface 11, for example. Through the aforementioned process, an inner ring which is a bearing ring of a rolling bearing is completed, and production of the bearing ring according to this embodiment is completed.

Referring to FIGS. 2 and 3, inner ring 10 according to this embodiment produced as described above has an inner diameter $d_3$ of, for example, at least 1000 mm and is constituted of hypereutectoid steel such as high carbon-chromium bearing steel (SUJ3, SUJ5 or the like). In inner ring 10, quench-hardened layer 11A is homogeneously formed by induction quenching along rolling contact surface 11 over the entire circumference. Thus, inner ring 10 according to this embodiment is a bearing ring of a rolling bearing in which quench-hardened layer 11A is formed by induction quenching along rolling contact surface 11 over the entire circumference and durability is excellent.

In inner ring 10, further, the area ratio of carbide in rolling contact surface 11 is preferably at least 5.2% and the hardness of rolling contact surface 11 is preferably at least 62 HRC. Thus, there can be obtained inner ring 10 having sufficient durability even when inner ring 10 is used in an environment where the contact stress between a rolling element and inner ring 10 is large and formation of an oil film between the rolling element and inner ring 10 is insufficient. Such a structure is obtained by retaining the temperature of heated region 11A within the range of predetermined temperature and time in which the aforementioned area ratio of carbide in and the aforementioned hardness of rolling contact surface 11 can be achieved, and thereafter, cooling the whole of heated region 11A in the aforementioned quench hardening step.

In this embodiment, coil 21 arranged to face part of the rolling contact surface of formed body 10 is relatively rotated along the circumferential direction in the step (S30), whereby heated region 11A is formed on formed body 10. Therefore, it is possible to employ coil 21 small with respect to the outer shape of formed body 10, and the production cost for a quenching apparatus can be suppressed also in a case of quench-hardening large-sized formed body 10. In this embodiment, further, the whole of heated region 11A is simultaneously cooled to the temperature of not more than the $M_s$ point. Therefore, it becomes possible to form an annular quench-hardened region homogeneous in the circumferential direction, and residual stress is inhibited from concentrating on a partial region. Furthermore, in this embodiment, hypereutectoid steel capable of implementing sufficiently high hardness and a sufficient amount of carbide by quench hardening is employed as a material. Consequently, according to the method for producing an inner ring according to this embodiment, the inner ring (bearing ring) in which the quench-hardened layer is homogeneously formed by induction quenching along the rolling contact surface over the entire circumference and durability including abrasion resistance is excellent can be produced while suppressing the production cost for the quenching apparatus.

While the aforementioned step (S20) is not an essential step in the method for producing a bearing ring according to the present invention, the hardness of an unhardened region (region other than the quench-hardened layer) of the produced bearing ring can be adjusted by carrying out this.

In the aforementioned step (S20), shot blasting may be executed while formed body 10 is cooled, by spraying hard particles onto formed body 10 along with gas. Thus, the shot blasting can be executed simultaneously with air-blast cooling at the time of the normalizing. Therefore, scales formed on the surface layer portion of formed body 10 due to heating in the normalizing are removed, and characteristic reduction of the bearing ring resulting from formation of the scales or reduction of thermal conductivity resulting from formation of the scales is suppressed. As the hard particles (projection material), metal particles made of steel or cast iron can be employed, for example.

While formed body 10 may rotate at least once in the aforementioned step (S30), the same preferably rotates a plurality of times, in order to implement more homogeneous quench hardening by suppressing dispersion in temperature in the circumferential direction. In other words, coil 21 as an induction heating member preferably relatively rotates at least twice along the circumferential direction of the rolling contact surface of formed body 10.

Tenth Embodiment

A tenth embodiment which is another embodiment of the present invention is now described. A method for producing an inner ring according to the tenth embodiment is basically carried out similarly to the case of the ninth embodiment, and attains similar effects. However, the method for producing an inner ring according to the tenth embodiment is different from the case of the ninth embodiment in arrangement of coils 21 in a step (S30).

In other words, referring to FIG. 4, a pair of coils 21 are arranged to hold a formed body 10 therebetween in the step (S30) in the tenth embodiment. Then, formed body 10 is rotated in a direction of arrow α, while a high-frequency current is supplied to coils 21 from a power source (not shown). Thus, a surface layer region of formed body 10 including a rolling contact surface 11 is induction-heated to a temperature of at least an $A_1$ point, and an annular heated region 11A along rolling contact surface 11 is formed.

Thus, plurality of (in this embodiment two) coils 21 are arranged along the circumferential direction of formed body 10, whereby the method for producing an inner ring of a rolling bearing according to the tenth embodiment has become a method for producing a bearing ring capable of implementing homogeneous quench hardening by suppressing dispersion in temperature in the circumferential direction. In order to further suppress the dispersion in temperature in the circumferential direction, coils 21 are preferably arranged at regular intervals in the circumferential direction of formed body 10.

Eleventh Embodiment

An eleventh embodiment which is a further embodiment of the present invention is now described. A method for producing an inner ring according to the eleventh embodiment is basically carried out similarly to the cases of the ninth and tenth embodiments, and attains similar effects. However, the method for producing an inner ring according to the eleventh embodiment is different from the cases of the ninth and tenth embodiments in arrangement of thermometers 22 in a step (S30).

In other words, referring to FIG. 5, temperatures on a plurality of portions (four portions here) of a rolling contact surface 11 which is a heated region are measured in the step (S30) in the eleventh embodiment. More specifically, a plurality of thermometers 22 are arranged at regular intervals along the circumferential direction of rolling contact surface 11 of a formed body 10 in the step (S30) in the eleventh embodiment.

Thus, the temperatures on the plurality of portions are simultaneously measured in the circumferential direction of rolling contact surface 11, whereby quench hardening can be executed by rapidly cooling formed body 10 after confirming that homogeneous heating is implemented in the circumferential direction of rolling contact surface 11. Consequently, more homogeneous quench hardening can be implemented in the circumferential direction of rolling contact surface 11 according to the method for producing an inner ring of a rolling bearing according to the eleventh embodiment.

While the case of fixing coils 21 and rotating formed body 10 has been described in the aforementioned embodiment, coils 21 may be rotated in the circumferential direction of formed body 10 while fixing formed body 10, or coils 21 may be relatively rotated along the circumferential direction of formed body 10 by rotating both of coils 21 and formed body 10. However, wires or the like supplying a current to coils 21 are necessary for coils 21, and hence it is for the most part rational to fix coils 21 as described above.

While a case where an inner ring of a radial rolling bearing is produced as an example of a bearing ring has been described in the aforementioned embodiment, a bearing ring to which the present invention is applicable is not restricted to this, but may be an outer ring of a radial rolling bearing or a bearing ring of a thrust bearing, for example. In a case of heating an outer ring of a radial rolling bearing, for example, in the step (S20), coils 21 may be arranged to face a rolling contact surface formed on an inner peripheral side of a formed body. In a case of heating a bearing ring of a thrust rolling bearing, for example, in the step (S20), coils 21 may be arranged to face a rolling contact surface formed on an end surface side of a formed body.

While the length of coils 21 as induction heating members in the circumferential direction of formed body 10 can be so properly decided as to efficiently implement homogeneous heating, the same can be set to about 1/12 of the length of the region to be heated, i.e., a length of such a degree that a central angle with respect to the central axis of the formed body (bearing ring) becomes 30°, for example.

Further, specific conditions for the induction quenching in the present invention can be properly set in consideration of conditions such as the size and the thickness of and the material for the bearing ring (formed body), the capacity of the power source and the like.

In order to suppress dispersion in temperature in the circumferential direction, a step of retaining the formed body in a state where the heating is stopped is preferably provided after completion of the induction heating and before the cooling to the temperature of not more than the $M_s$ point. More specifically, dispersion in temperature in the circumferential direction on the surface of the heated region can be suppressed to about not more than 20° C. under the aforementioned conditions of the shape of the formed body and the heating, by retaining the formed body in the state where the heating is stopped for three seconds after completion of the heating, for example.

Twelfth Embodiment

A twelfth embodiment in which bearing rings according to the present invention are employed as bearing rings constituting bearings for a wind turbine generator (rolling bearings for a wind turbine generator) is now described.

Referring to FIG. 6, a wind turbine generator 50 includes a blade 52 which is a swirler, a main shaft 51 connected to blade 52 on one end to include a center shaft of blade 52, and a speed increaser 54 connected to another end of main shaft 51. Further, speed increaser 54 includes an output shaft 55, and output shaft 55 is connected to a generator 56. Main shaft 51 is supported by main shaft bearings 3 which are rolling bearings for a wind turbine generator, to be rotatable on an axis. A plurality of (in FIG. 6 two) main shaft bearings 3 are arranged in line in the axial direction of main shaft 51, and held by housings 53 respectively. Main shaft bearings 3, housings 53, speed increaser 54 and generator 56 are stored in a nacelle 59 which is a machinery room. Main shaft 51 protrudes from nacelle 59 on one end, and is connected to blade 52.

Operation of wind turbine generator 50 is now described. Referring to FIG. 6, when blade 52 rotates in the circumferential direction by receiving wind power, main shaft 51 connected to blade 52 rotates on the axis while being supported by main shaft bearings 3 with respect to housings 53. The rotation of main shaft 51 is transmitted to speed increaser 54 to be speeded up, and converted to rotation of output shaft 55 on an axis. The rotation of output shaft 55 is transmitted to generator 56, and electromotive force is so generated by electromagnetic induction that power generation is achieved.

A support structure for main shaft 51 of wind turbine generator 50 is now described. Referring to FIG. 7, each main shaft bearing 3 as a rolling bearing for a wind turbine generator includes an annular outer ring 31 as a bearing ring of the rolling bearing for a wind turbine generator, an annular inner ring 32 as another bearing ring of the rolling bearing for a wind turbine generator arranged on the inner peripheral side of outer ring 31, and a plurality of rollers 33 arranged between outer ring 31 and inner ring 32 and held by an annular cage 34. An outer ring rolling contact surface 31A is formed on the inner peripheral surface of outer ring 31, and two inner ring rolling contact surfaces 32A are formed on the outer peripheral surface of inner ring 32. Outer ring 31 and inner ring 32 are so arranged that two inner ring rolling contact surfaces 32A are opposed to outer ring rolling contact surface 31A. Further, plurality of rollers 33 are in contact with outer ring rolling contact surface 31A and inner ring rolling contact surfaces 32A on roller contact surfaces 33A along the respective ones of two inner ring rolling contact surfaces 32A, and held by cage 34 and arranged at a prescribed pitch in the circumferential direction, to be rollably held on double rows (two rows) of annular raceways. A through-hole 31E passing through outer ring 31 in the radial direction is formed in outer ring 31. A lubricant can be supplied to a space between outer ring 31 and inner ring 32 through this through-hole 31E. Outer ring 31 and inner ring 32 of main shaft bearing 3 are mutually relatively rotatable, due to the aforementioned structure.

On the other hand, main shaft 51 connected to blade 52 passes through inner ring 32 of main shaft bearing 3, is in contact with an inner peripheral surface 32F of the inner ring on an outer peripheral surface 51A, and fixed to inner ring 32. Outer ring 31 of main shaft bearing 3 is fitted to come into contact with an inner wall 53A of a through-hole formed in housing 53 on an outer peripheral surface 31F, and fixed to housing 53. Main shaft 51 connected to blade 52 is rotatable on the axis with respect to outer ring 31 and housing 53 integrally with inner ring 32, due to the aforementioned structure.

Further, flange portions 32E protruding toward outer ring 31 are formed on both ends of inner ring rolling contact surfaces 32A in the width direction. Thus, a load in the axial direction (axial direction) of main shaft 51 caused by blade 52 receiving wind is supported. Outer ring rolling contact surface 31A has a spherical surface shape. Therefore, outer ring 31 and inner ring 32 can mutually form an angle while centering on the center of this spherical surface on a section perpendicular to the rolling direction of rollers 33. In other words, main shaft bearing 3 is a double-row self-aligning roller bearing. Consequently, even in a case where main shaft 51 is deflected due to blade 52 receiving wind, housing 53 can stably rotatably hold main shaft 51 through main shaft bearing 3.

Outer ring 31 and inner ring 32 as bearing rings of a rolling bearing for a wind turbine generator according to the twelfth embodiment are produced by the method for producing a bearing ring according to the aforementioned ninth to eleventh embodiments, for example, and have a structure similar to that of inner ring 10 in the aforementioned ninth embodiment. In other words, outer ring 31 and inner ring 32 are bearing rings of a rolling bearing for a wind turbine generator having inner diameters of at least 1000 mm. Outer ring 31 and inner ring 32 are constituted of hypereutectoid steel and quench-hardened layers are homogeneously formed by induction quenching along outer ring rolling contact surface 31A and inner ring rolling contact surfaces 32A over the entire circumference. In other words, outer ring 31 and inner ring 32 have inner diameters of at least 1000 mm, and are constituted of hypereutectoid steel, and have quench-hardened layers, formed by induction quenching, of annular shapes along the circumferential direction having uniform depths, and the surfaces of the quench-hardened layers form outer ring rolling contact surface 31A and inner ring rolling contact surfaces 32A respectively. Consequently, aforementioned outer ring 31 and inner ring 32 have become large-sized bearing rings excellent in durability, in which quench-hardened layers are homogeneously formed by induction quenching along the rolling contact surfaces over the entire circumference while the cost for heat treatment is suppressed, and have become bearing rings constituting a bearing for a wind turbine generator usable also in a severe environment.

Since aforementioned inner ring 32 rotates together with main shaft 51, inner ring rolling contact surface 32A serves as a load region over the entire circumference. On the other hand, in inner ring 32, the quench-hardened layer is formed by induction quenching along inner ring rolling contact surface 32A over the entire circumference. Therefore, even when inner ring rolling contact surface 32A serves as the load region over the entire circumference, inner ring 32 has sufficient durability.

Furthermore, main shaft bearing 3 may be used in an environment where a value of oil film parameter Λ is not more than 1 due to repeated rotation and stop of main shaft 51, and the like. On the other hand, outer ring 31 and inner ring 32 constituting main shaft bearing 3 are bearing rings according to the present invention excellent in durability including abrasion resistance. Therefore, even in a case of use in such a severe environment, main shaft bearing 3 has sufficient durability. Main shaft bearing 3 excellent in durability is also suitable as a main shaft bearing for offshore wind power generation where repair is difficult.

While the bearings for a wind turbine generator have been described as examples of the large-sized rolling bearing in the aforementioned twelfth embodiment, application to another large-sized rolling bearing is also possible. More specifically, the bearing ring according to the present invention can be suitably applied to a bearing ring of a rolling bearing for a CT scanner supporting a rotatable mounting on which an X-ray irradiation portion of a CT scanner is set to be rotatable with respect to a fixed mounting arranged to be opposed to the rotatable mounting, for example. Further, the bearing ring according to the present invention is applicable to a bearing ring of an arbitrary rolling bearing such as a deep groove ball bearing, an angular contact ball bearing, a cylindrical roller bearing, a tapered roller bearing, a self-aligning roller bearing or a thrust ball bearing, for example.

EXAMPLE

Example 1

An experiment of checking the abrasion resistance of a bearing ring of a rolling bearing according to the present invention was conducted. The experiment was conducted using a Savant-type abrasion testing machine. First, JIS SUJ5 was employed as a material and processed into a desired shape of a test specimen. Thereafter, quench hardening was executed to create the test specimen (Example). A surface roughness Ra of the test specimen was set to be 0.010 µm. On the other hand, for comparison, a test specimen was also prepared by employing JIS S55C as a material and adopting a similar method (Comparative Example). Then, an area ratio of carbide in the obtained test specimens was measured and the test specimens were subjected to a Savant-type abrasion test. A member constituted of SUJ2 and having surface roughness Ra of 0.015 µm was employed as a counterpart member. A load at the time of the test was 50N, a relative speed of the test specimens and the counterpart member was 0.05 m/s, the test time was 60 minutes, and Mobile Velocity Oil No. 3 (registered trademark) (VG2) was employed as a lubricant. A specific abrasion rate was calculated from an amount of abrasion of the test specimens after the end of the test, and the abrasion resistance was evaluated. The test result is shown in Table 1.

TABLE 1

| type of steel | SUJ5 (Example) | S55C (Comparative Example) |
|---|---|---|
| area ratio of carbide (%) | 8.8 | 0.1 |
| specific abrasion rate ($\times 10^{-10}$ mm$^3$/Nm) | 181 | 286 |

Referring to Table 1, the specific abrasion rate of the test specimen in Example is about 63% of the specific abrasion rate of the test specimen in Comparative Example. This is conceivably due to the fact that the area ratio of carbide in the test specimen in Comparative Example is 0.1%, whereas the area ratio of carbide in the test specimen in Example is 8.8%. Thus, it has been confirmed that according to the bearing ring of the rolling bearing according to the present invention, high abrasion resistance can be ensured because a sufficient amount of carbide is contained.

From the perspective of ensuring sufficient abrasion resistance, the area ratio of carbide is preferably at least 2%, and more preferably at least 4%. On the other hand, since the problem of lowering of the hardness may arise, the area ratio of carbide is preferably not more than 11%, and more preferably not more than 9%.

Example 2

Figure 8:
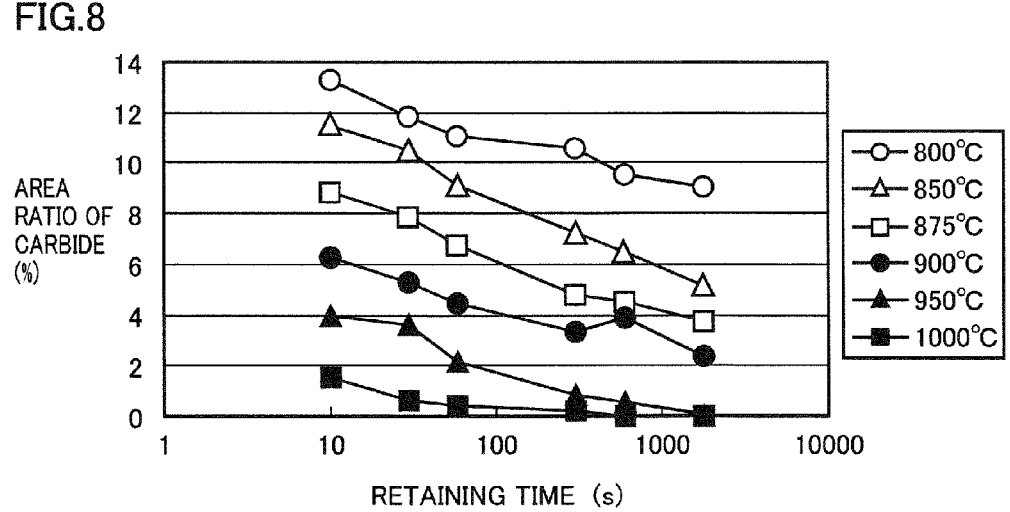
FIG. 8 is a graph showing a relationship between the retaining time and the area ratio of carbide at each temperature.
Figure 9:
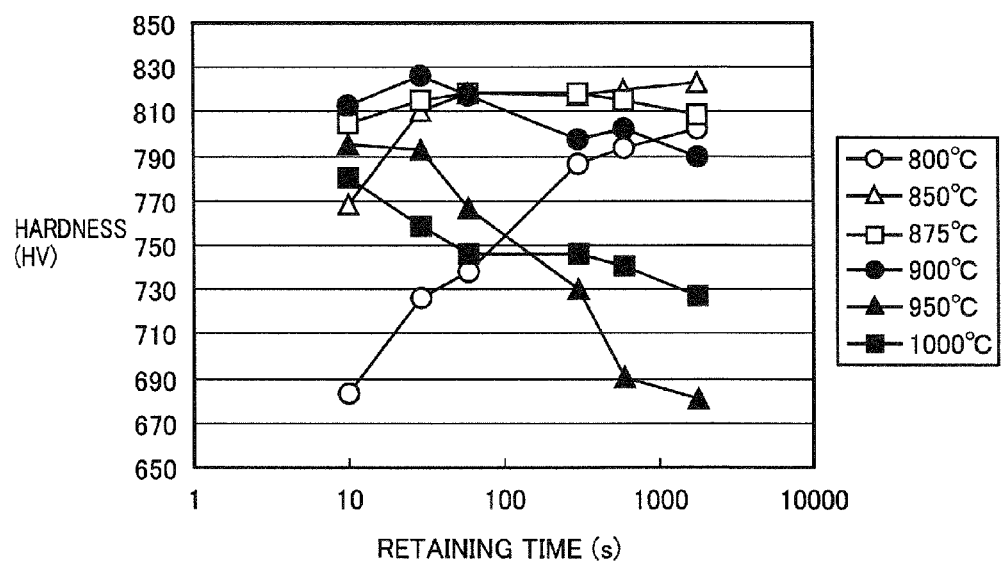
FIG. 9 is a graph showing a relationship between the retaining time and the hardness at each temperature.

As one example of a method for determining a range of temperature and time in which at least a prescribed amount of carbide remains in the rolling contact surface of the bearing ring and the rolling contact surface has a hardness of at least a prescribed hardness in the quench hardening step, an experiment of determining a range of temperature and time in which the area ratio of carbide in the rolling contact surface becomes at least 5.2% and the hardness of the rolling contact surface becomes at least 62 HRC was conducted. The procedure of the experiment is as follows:

First, a test specimen constituted of JIS SUJ5 was prepared. Then, this test specimen was retained for each time of 10, 30, 60, 300, 600, and 1800 seconds at each temperature of 800, 850, 875, 900, 950, and 1000° C. at a temperature rise rate of 3° C./sec by high-frequency heating, and thereafter, was rapidly cooled, whereby the test specimen was quench-hardened. Then, the obtained test specimen was cut and the cut surface was polished. Furthermore, the section was corroded using picral (picric acid alcohol solution) as a corrosive liquid and the area ratio of carbide observed in the metal structure was investigated. In addition, the obtained test specimen was cut and the hardness was investigated using a Vickers hardness tester. The investigation result is shown in FIGS. 8 and 9. In FIGS. 8 and 9, the horizontal axis indicates the retaining time. The vertical axis in FIG. 8 indicates the area ratio of carbide, and the vertical axis in FIG. 9 indicates the Vickers hardness.

Referring to FIG. 8, it is confirmed that the area ratio of carbide becomes smaller as the heating temperature becomes higher, and becomes smaller as the retaining time becomes longer. This is conceivably because a larger amount of carbide melts into the base as the heating temperature becomes higher, and a larger amount of carbide melts into the base as the retaining time becomes longer.

On the other hand, referring to FIG. 9, in the heating temperature range of 800 to 850° C., the hardness becomes higher as the retaining time becomes longer. In the heating temperature range of 875 to 900° C., the hardness becomes higher as the retaining time becomes longer, and thereafter, the hardness becomes lower as the retaining time becomes further longer. In the heating temperature range of 950 to 1000° C., the hardness becomes lower as the retaining time becomes longer. This is conceivably because, when the heating temperature is low, an amount of carbon contained in a martensite structure after quenching increases and the hardness becomes higher as the retaining time becomes longer, whereas when the heating temperature is high, an amount of remaining austenite after quenching increases and the hardness is lowered as the retaining time becomes longer.

Figure 10:
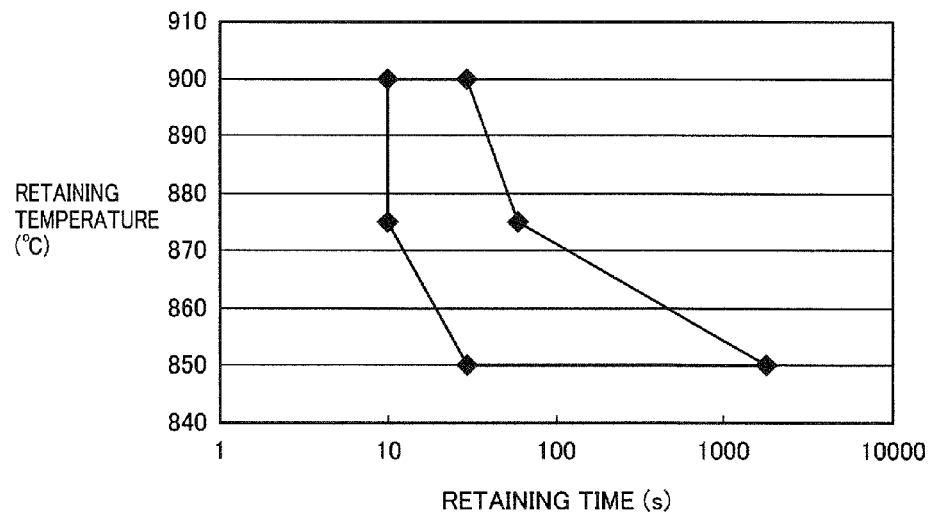
FIG. 10 is a graph showing the proper range of the retaining time and the retaining temperature.

From the aforementioned experimental result, the range of temperature and time in which the area ratio of carbide becomes at least 5.2% and the hardness becomes at least 62 HRC can be determined. FIG. 10 is a diagram showing this range. The hardness of 62 HRC corresponds to the hardness of 746 HV. In FIG. 10, the horizontal axis indicates the retaining time, and the vertical axis indicates the retaining temperature. By executing induction quenching in the range of temperature and time corresponding to a region surrounded by a line segment connecting the respective points in FIG. 10, such a preferable structure that the area ratio of carbide in the rolling contact surface is at least 5.2% and the hardness of the rolling contact surface is at least 62 HRC can be obtained. Thus, not only by focusing attention simply on the hardness but also creating a TTA (Time Temperature Austenitization) diagram taking the area ratio of carbide into consideration as well, and retaining the temperature of the heated region within the range of predetermined temperature and time based on this diagram, and thereafter, cooling the whole of the heated region in the quench hardening step, the bearing ring excellent in durability including abrasion resistance can be easily produced.

Example 3

A simulation of checking an advantage of the method for producing a bearing ring according to the aforementioned embodiments was performed. On the assumption of the case of quench-hardening a bearing ring having an outer diameter of φ2000 mm, a temperature history at one arbitrary point on the rolling contact surface was calculated. As a method for quench hardening, the following two methods were studied: a method for executing high-frequency induction heating with a coil arranged to be opposed to part of the rolling contact surface in the circumferential direction, and injecting a cooling liquid toward the heated region immediately after passage of the coil thereby successively quench-hardening this region (transfer quenching); and a method for relatively rotating a coil arranged to face part of the rolling contact surface along the circumferential direction, forming an annular heated region and simultaneously cooling the whole of the heated region to a temperature of not more than the $M_s$ point (Example; corresponding to the method for producing a bearing ring according to the aforementioned embodiments). The aforementioned transfer quenching corresponds to the aforementioned method described in PTD 2.

Figure 11:
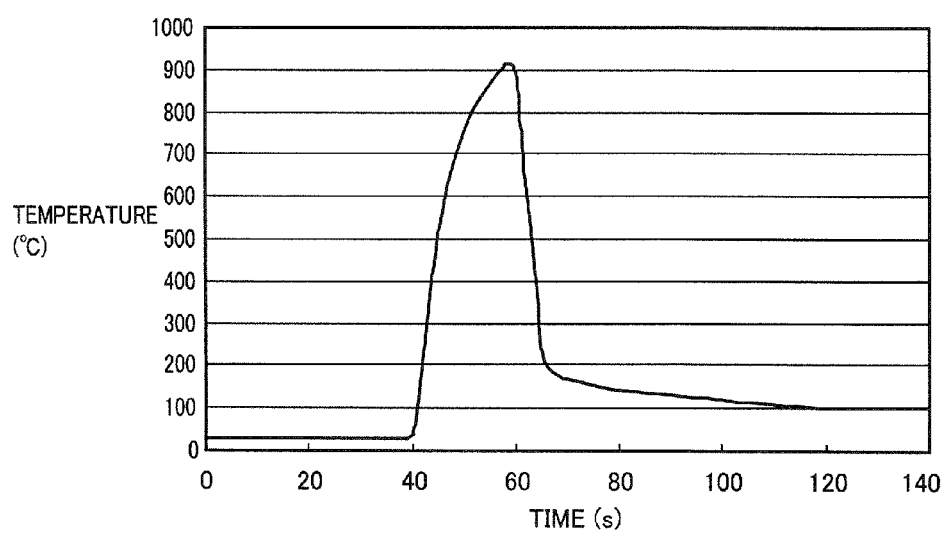
FIG. 11 is a graph showing a temperature history at one arbitrary point of a rolling contact surface when transfer quenching is executed.

As shown in FIG. 11, when the transfer quenching is executed, the one point on the rolling contact surface is rapidly heated in a short time and thereafter cooled immediately. In quench-hardening of the bearing ring constituted of hypereutectoid steel to which the present invention is directed, proper quench hardening is achieved by rapidly cooling the bearing ring from a proper carbon-dissolved state in which a required and sufficient amount of carbon is dissolved in the base, while leaving a desired amount of carbide (cementite) in a microstructure of the steel constituting the bearing ring. When the amount of remaining carbide is large and the amount of dissolved carbon is small, it is difficult to supply sufficient hardness to the rolling contact surface. Conversely, when the amount of remaining carbide is small and the amount of dissolved carbon is large, it is difficult to supply sufficient abrasion resistance and the risk of occurrence of quench cracking also increases. While the amount of carbon dissolved in the steel base depends on the heating temperature and the retaining time, an increase in the amount of dissolved carbon is saturated with the passage of time when a change in heating temperature is small. Therefore, the amount of dissolved carbon can be easily controlled by decreasing the change in heating temperature and retaining the heating temperature for a long time. As described above, however, in the quench hardening using the transfer quenching shown in FIG. 11, the change in heating temperature is large and the retaining time is short, and thus, it is extremely difficult to control the amount of dissolved carbon. Therefore, it is not regarded as realistic to achieve proper quench hardening by applying the transfer quenching to the method for producing a bearing ring constituted of hypereutectoid steel.

Figure 12:
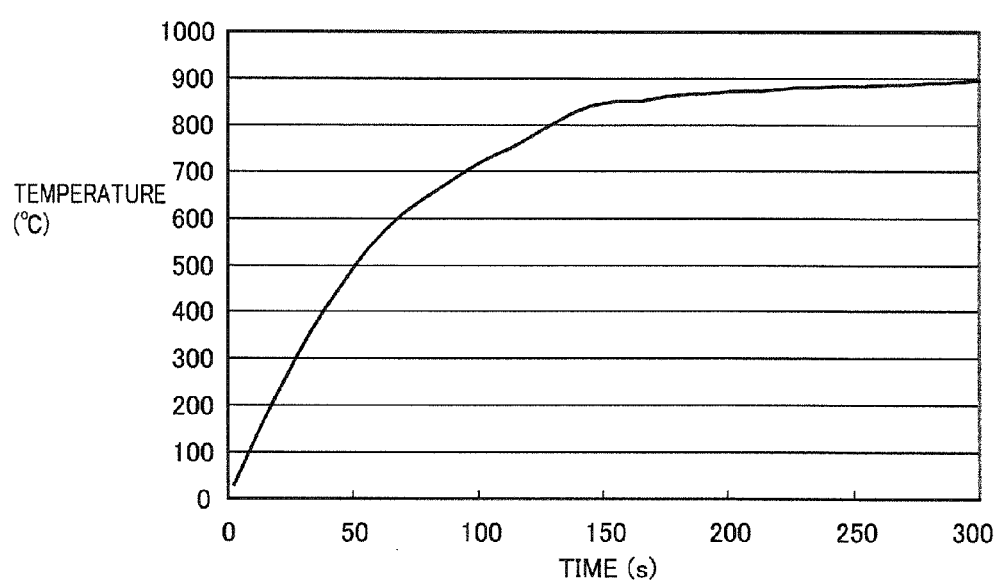
FIG. 12 is a graph showing a temperature history at one arbitrary point of the rolling contact surface.

On the other hand, as shown in FIG. 12, when the quench-hardening method in Example corresponding to the method for producing a bearing ring according to the aforementioned embodiments is employed, the one point on the rolling contact surface is heated to a temperature of at least the transformation $A_1$ point capable of quench hardening and thereafter retained for a long time with small change in temperature (the cooling to a temperature of not more than the $M_s$ point is not shown in the figure because it is executed after the time further elapses). Therefore, in the method in Example, the amount of dissolved carbon can be easily controlled. Consequently, when the quenching method in Example is employed, proper quench hardening can be easily achieved.

From the aforementioned results, it has been confirmed that proper quench hardening of the bearing ring constituted of hypereutectoid steel can be easily achieved according to the method for producing a bearing ring according to the aforementioned embodiments.

The embodiments and Example disclosed this time must be considered as illustrative in all points, and not restrictive. The range of the present invention is shown not by the above description but by the scope of claims for patent, and it is intended that all modifications within the meaning and range equivalent to the scope of claims for patent are included.

INDUSTRIAL APPLICABILITY

A method for producing a bearing ring, a bearing ring, and a rolling bearing according to the present invention can be applied particularly advantageously to a method for producing a bearing ring which is required to homogeneously form a quench-hardened layer along a rolling contact surface over the entire circumference, while suppressing the production cost for a quenching apparatus, a bearing ring of a rolling bearing which is required to form a quench-hardened layer along a rolling contact surface over the entire circumference, and a rolling bearing including the bearing ring.

REFERENCE SIGNS LIST

3 main shaft bearing, 10 formed body (inner ring), 11 rolling contact surface, 11A heated region (quench-hardened layer), 21 coil, 22 thermometer, 31 outer ring, 31A outer ring rolling contact surface, 31E through-hole, 31F outer peripheral surface, 32 inner ring, 32A inner ring rolling contact surface, 32E flange portion, 32F inner peripheral surface, 33 roller, 33A roller contact surface, 34 cage, 50 wind turbine generator, 51 main shaft, 51A outer peripheral surface, 52 blade, 53 housing, 53A inner wall, 54 speed increaser, 55 output shaft, 56 generator, 59 nacelle.

The invention claimed is:

1. A method for producing a bearing ring of a rolling bearing, comprising the steps of:
   preparing a formed body constituted of hypereutectoid steel;
   forming an annular heated region heated to a temperature of at least an $A_1$ point on said formed body by relatively rotating an induction heating member arranged to face part of the annular region of said formed body for becoming a rolling contact surface of said bearing ring in said formed body to induction-heat said formed body along a circumferential direction of said annular region, wherein said formed body is retained at a temperature of 850° C. to 900° C. for a period of time greater than 10 seconds to 1,800 seconds; and simultaneously cooling a whole of said annular heated region to a temperature of not more than an $M_s$ point, wherein in the step of cooling the whole of said annular heated region, the temperature of said annular heated region is retained within a range of predetermined temperature and time in which an area ratio of carbide in said rolling contact surface becomes at least 5.2% and a hardness of said rolling contact surface becomes at least 62 HRC after the whole of said annular heated region is cooled, and wherein said hypereutectoid steel is steel containing at least 0.95 mass % and not more than 1.10 mass % of carbon, at least 0.40 mass % and not more than 0.70 mass % of silicon, at least 0.90 mass % and not more than 1.15 mass % of manganese, and at least 0.90 mass % and not more than 1.20 mass % of chromium with the rest consisting of iron and an impurity.

2. A method for producing a bearing ring of a rolling bearing, comprising the steps of:

preparing a formed body constituted of hypereutectoid steel;

forming an annular heated region heated to a temperature of at least an $A_1$ point on said formed body by relatively rotating an induction heating member arranged to face part of the annular region of said formed body for becoming a rolling contact surface of said bearing ring in said formed body to induction-heat said formed body along a circumferential direction of said annular region, wherein said formed body is retained at temperature of 850° C. to 900° C. for a period of time greater than 10 seconds to 1,800 seconds; and simultaneously cooling a whole of said annular heated region to a temperature of not more than an $M_s$ point, wherein in the step of cooling the whole of said annular heated region, the temperature of said annular heated region is retained within a range of predetermined temperature and time in which an area ratio of carbide in said rolling contact surface becomes at least 5.2% and a hardness of said rolling contact surface becomes at least 62 HRC after the whole of said annular heated region is cooled, and wherein said hypereutectoid steel is steel containing at least 0.95 mass % and not more than 1.10 mass % of carbon, at least 0.40 mass % and not more than 0.70 mass % of silicon, at least 0.90 mass % and not more than 1.15 mass % of manganese, at least 0.90 mass % and not more than 1.20 mass % of chromium, and at least 0.10 mass % and not more than 0.25 mass % of molybdenum with the rest consisting of iron and an impurity.

* * * * *